(12) United States Patent
Steinmetz et al.

(10) Patent No.: US 10,196,528 B2
(45) Date of Patent: *Feb. 5, 2019

(54) METHOD FOR PRODUCING A MULTICOAT PAINT SYSTEM

(71) Applicant: BASF Coatings GmbH, Muenster (DE)

(72) Inventors: Bernhard Steinmetz, Ruetschenhausen (DE); Nadia Luhmann, Karlstadt-Stetten (DE); Peggy Jankowski, Guentersleben (DE); Michael Matura, Kitzingen (DE); Hardy Reuter, Muenster (DE); Peter Hoffmann, Senden (DE)

(73) Assignee: BASF Coatings GmbH, Muenster (DE)

( * ) Notice: Subject to any disclaimer, the term of this patent is extended or adjusted under 35 U.S.C. 154(b) by 247 days.

This patent is subject to a terminal disclaimer.

(21) Appl. No.: 15/104,820

(22) PCT Filed: Dec. 11, 2014

(86) PCT No.: PCT/EP2014/077383
§ 371 (c)(1),
(2) Date: Jun. 15, 2016

(87) PCT Pub. No.: WO2015/091204
PCT Pub. Date: Jun. 25, 2015

(65) Prior Publication Data
US 2016/0347957 A1 Dec. 1, 2016

(30) Foreign Application Priority Data

Dec. 18, 2013 (EP) .................................... 13197961

(51) Int. Cl.
*C25D 13/04* (2006.01)
*C09D 5/44* (2006.01)
*B05D 7/00* (2006.01)

(52) U.S. Cl.
CPC .............. *C09D 5/4465* (2013.01); *B05D 7/53* (2013.01); *B05D 7/577* (2013.01); *C25D 13/04* (2013.01)

(58) Field of Classification Search
CPC ......... C09D 5/4465; B05D 7/53; C25D 13/04
See application file for complete search history.

(56) References Cited

U.S. PATENT DOCUMENTS 5,334,420 A 8/1994 Hartung et al.
5,368,944 A 11/1994 Hartung et al.
(Continued)

FOREIGN PATENT DOCUMENTS

DE  1 198 348      8/1965
DE  1768313 B2    5/1977
(Continued)

OTHER PUBLICATIONS

International Search Report dated Feb. 18, 2015 in PCT/EP2014/077383 filed Dec. 11, 2014.

*Primary Examiner* — Francisco W Tschen
(74) *Attorney, Agent, or Firm* — Oblon, McClelland, Maier & Neustadt, L.L.P.

(57) ABSTRACT

The present invention relates to a method for producing a multicoat paint system on a metallic substrate, in which a basecoat or a plurality of directly successive basecoats are produced directly on a metallic substrate coated with a cured electrocoat, a clearcoat is produced directly on the one basecoat or the uppermost of the plurality of basecoats, and then the one or more basecoats and the clearcoat are jointly cured, and wherein at least one basecoat material used for production of the basecoats comprises the following components: an aqueous dispersion comprising at least one specific copolymer, a specific linear hydroxy-functional reaction product and a polyurethane resin, the preparation of which involves using at least one compound containing at (Continued)

least one carboxylic acid group and at least one group reactive toward isocyanate groups.

19 Claims, 1 Drawing Sheet

(56) References Cited

U.S. PATENT DOCUMENTS

| | | | |
|---|---|---|---|
| 5,370,910 | A | 12/1994 | Hille et al. |
| 5,512,322 | A | 4/1996 | Hille et al. |
| 5,854,337 | A | 12/1998 | Wandelmaier et al. |
| 6,632,915 | B1 | 10/2003 | Schwarte et al. |
| 2013/0095316 | A1* | 4/2013 | Lamers ............... C23C 28/00 428/335 |

FOREIGN PATENT DOCUMENTS

| | | |
|---|---|---|
| DE | 40 09 858 A1 | 10/1991 |
| DE | 44 37 535 A1 | 4/1996 |
| DE | 199 30 665 A1 | 1/2001 |
| DE | 100 43 405 C1 | 6/2002 |
| DE | 199 48 004 B4 | 5/2006 |
| EP | 0 228 003 A1 | 7/1987 |
| EP | 0 634 431 A1 | 1/1995 |
| EP | 0 839 885 A1 | 5/1998 |
| WO | 90/01041 A1 | 2/1990 |
| WO | 91/13918 A1 | 9/1991 |
| WO | 91/15528 A1 | 10/1991 |
| WO | 92/15405 A1 | 9/1992 |
| WO | 93/16139 A1 | 8/1993 |
| WO | 98/33835 A1 | 8/1998 |
| WO | 01/02498 A1 | 1/2001 |
| WO | 2004/018580 A1 | 3/2004 |
| WO | 2006/042585 A1 | 4/2006 |
| WO | 2008/074490 A1 | 6/2008 |
| WO | 2009/077182 A1 | 6/2009 |

* cited by examiner

METHOD FOR PRODUCING A MULTICOAT PAINT SYSTEM

CROSS-REFERENCE TO RELATED APPLICATIONS

This application is a National Stage of PCT/EP2014/077383, which was filed on Dec. 11, 2014. This application is based upon and claims the benefit of priority to European Application No. 13197961.9, which was filed on Dec. 18, 2013.

The present invention relates to a method for producing a multicoat paint system, in which a basecoat or a plurality of directly successive basecoats are produced directly on a metallic substrate coated with a cured electrocoat, a clearcoat is produced directly on the one basecoat or the uppermost of the plurality of basecoats, and then the one or more basecoats and the clearcoat are jointly cured. The present invention additionally relates to a multicoat paint system which has been produced by the method of the invention.

PRIOR ART

Multicoat paint systems on metallic substrates, for example multicoat paint systems in the automobile industry, are known. In general, multicoat paint systems of this kind comprise, viewed from the metallic substrate outward, an electrocoat, a layer which has been applied directly to the electrocoat and is usually referred to as the primer-surfacer coat, at least one coat which comprises color pigments and/or effect pigments and is generally referred to as the basecoat, and a clearcoat.

The basic compositions and functions of these layers and of the coating compositions needed to form these layers, i.e. electrocoat materials, so-called primer-surfacers, coating compositions which comprise color pigments and/or effect pigments and are known as basecoat materials, and clearcoat materials, are known. For example, the electrocoat applied by electrophoresis serves basically to protect the substrate from corrosion. The so-called primer-surfacer coat serves principally for protection from mechanical stress, for example stone-chipping, and additionally to level out unevenness in the substrate. The next coat, referred to as the basecoat, is principally responsible for the creation of esthetic properties such as color and/or effects such as flop, while the clearcoat which then follows serves particularly to impart scratch resistance and the gloss of the multicoat paint system.

These multicoat paint systems are generally produced by first applying or depositing an electrocoat, especially a cathodic electrocoat, by electrophoresis on the metallic substrate, for example an automobile body. Prior to the deposition of the electrocoat, the metallic substrate can be pretreated in different ways; for example, it is possible to apply known conversion coatings such as phosphate coats, especially zinc phosphate coats. The deposition process of electrocoating generally takes place in appropriate electrocoating baths. After the application, the coated substrate is removed from the bath, optionally rinsed and flashed off and/or intermediately dried, and the electrocoat applied is finally cured. The target film thicknesses are about 15 to 25 micrometers. Subsequently, the so-called primer-surfacer is applied directly to the cured electrocoat, optionally flashed off and/or intermediately dried, and then cured. In order that the cured primer-surfacer coat can fulfill the abovementioned tasks, target film thicknesses are, for example, 25 to 45 micrometers. Subsequently, a so-called basecoat which comprises color pigments and/or effect pigments is applied directly to the cured primer-surfacer coat, and is optionally flashed off and/or intermediately dried, and a clearcoat is applied directly to the basecoat thus produced without separate curing. Subsequently, the basecoat, and the clearcoat which has optionally likewise been flashed off and/or intermediately dried beforehand, are jointly cured (wet-on-wet method). While the cured basecoat in principle has comparatively low film thicknesses of, for example, 10 to 30 micrometers, target film thicknesses for the cured clearcoat are, for example, 30 to 60 micrometers, in order to achieve the performance properties described. Primer-surfacer, basecoat and clearcoat can be applied, for example, via the application methods, which are known to those skilled in the art, of pneumatic and/or electrostatic spray application. Nowadays, primer-surfacer and basecoat are increasingly being used in the form of aqueous coating materials, for environmental reasons at least.

Even though the multicoat paint systems thus produced can generally meet the demands made by the automobile industry on performance properties and esthetic profile, the simplification of the comparatively complex production process described, for environmental and economic reasons, is now the subject of increasing attention from the automobile manufacturers.

For instance, there are approaches in which an attempt is made to dispense with the separate curing step for the coating composition applied directly to the cured electrocoat (for the coating composition referred to as primer-surfacer in the context of the above-described standard method), and also at the same time to lower the film thickness of the coating film produced from this coating composition. In the specialist field, this coating film which is thus not cured separately is then frequently referred to as the basecoat (and no longer as the primer-surfacer coat), or as the first basecoat as opposed to a second basecoat which is applied thereto. There are even some attempts to completely dispense with this coating film (in which case only a so-called basecoat is produced directly on the electrocoat, which is overcoated with a clearcoat without a separate curing step, meaning that a separate curing step is ultimately likewise dispensed with). Instead of the separate curing step and an additional final curing step, there is thus to be only a final curing step after application of all the coating films applied to the electrocoat.

Specifically the omission of a separate curing step for the coating composition applied directly to the electrocoat is very advantageous from an environmental and economic point of view. This is because it leads to an energy saving, and the overall production process can of course run much more stringently and rapidly.

Instead of the separate curing step, it is thus advantageous that the coating film produced directly on the electrocoat is flashed off only at room temperature and/or intermediately dried at elevated temperatures, without conducting a curing operation, which is known to regularly require elevated curing temperatures and/or long curing times.

It is problematic, however, that the required performance properties often cannot be obtained nowadays in this form of production. A problem which often occurs in this context is that impact resistance, which is very important specifically in automobiles, is not achieved to a satisfactory level. Impact resistance refers to the mechanical resistance of coatings to rapid deformation. Of particularly high relevance in this context is stone-chip resistance, meaning the resistance of a paint system to stones which hit the surface of the paint system at high speed. This is because automotive paint systems are exposed particularly to this stone-chipping to a very intense degree.

It would accordingly be advantageous to have a method for producing multicoat paint systems in which it is possible to dispense with a separate curing step, as described above, for the coating composition applied directly to the electrocoat, and the multicoat paint system produced nevertheless has excellent impact resistance, especially stone-chip resistance.

Problem

The problem addressed by the present invention was accordingly that of finding a method for producing a multicoat paint system on metallic substrates, in which the coating composition applied directly to the electrocoat is not cured separately, but in which this coating composition is instead cured in a joint curing step with further coating films applied thereafter. In spite of this method simplification, the resulting multicoat paint systems should have excellent impact resistance, especially stone-chip resistance, such that the multicoat paint systems especially meet the performance demands from the automobile manufacturers and their customers.

Technical Solution

It has been found that the problems mentioned are solved by a novel method for producing a multicoat paint system (M) on a metallic substrate (S), comprising
(1) producing a cured electrocoat (E.1) on the metallic substrate (S) by electrophoretic application of an electrocoat (e.1) to the substrate (S) and subsequent curing of the electrocoat (e.1),
(2) producing (2.1) a basecoat (B.2.1) or (2.2) a plurality of directly successive basecoats (B.2.2.x) directly on the cured electrocoat (E.1) by (2.1) applying an aqueous basecoat material (b.2.1) directly to the electrocoat (E.1) or (2.2) applying a plurality of basecoat materials (b.2.2.x) in direct succession to the electrocoat (E.1),
(3) producing a clearcoat (K) directly on (3.1) the basecoat (B.2.1) or (3.2) the uppermost basecoat (B.2.2.x) by applying a clearcoat material (k) directly to (3.1) the basecoat (B.2.1) or (3.2) the uppermost basecoat (B.2.2.x),
(4) jointly curing (4.1) the basecoat (B.2.1) and the clearcoat (K) or (4.2) the basecoats (B.2.2.x) and the clearcoat (K), wherein
the basecoat material (b.2.1) or at least one of the basecoat materials (b.2.2.x) comprises the following components:
at least one aqueous dispersion comprising at least one copolymer (CP), said copolymer (CP) being preparable by
  (i) initially charging an aqueous dispersion of at least one polyurethane, and then
  (ii) polymerizing a mixture of olefinically unsaturated monomers in the presence of the polyurethane from (i), in which
    (a) a water-soluble initiator is used,
    (b) the olefinically unsaturated monomers are metered in such that a concentration of 6.0-% by weight, based on the total amount of olefinically unsaturated monomers used for polymerization, in the reaction solution is not exceeded over the entire reaction time, and
    (c) the mixture of the olefinically unsaturated monomers comprises at least one polyolefinically unsaturated monomer, at least one linear hydroxy-functional reaction product (R) having an acid number less than 20 mg KOH/g, the preparation of which involves using at least one compound (v) containing two functional groups (v.a) and an aliphatic or araliphatic hydrocarbyl radical (v.b) which is arranged between the functional groups and has 12 to 70 carbon atoms,
and
at least one polyurethane resin (X), the preparation of which involves using at least one compound (x.1) containing at least one carboxylic acid group and at least one group reactive toward isocyanate groups.

The abovementioned method is also referred to hereinafter as method of the invention, and accordingly forms part of the subject matter of the present invention. Preferred embodiments of the method of the invention can be found in the description which follows below and in the dependent claims.

The present invention further provides a multicoat paint system which has been produced by the method of the invention.

The method of the invention allows the production of multicoat paint systems without a separate curing step for the coating film produced directly on the electrocoat. For the sake of better clarity, this coating film is referred to as basecoat in the context of the present invention. Instead of separate curing, this basecoat is jointly cured together with any further basecoats beneath the clearcoat, and the clearcoat. In spite of this, the employment of the method according to the invention results in multicoat paint systems having excellent impact resistance, especially stone-chip resistance. It is additionally possible to form the corresponding basecoats with aqueous coating compositions, in order thus to satisfy environmental demands.

DETAILED DESCRIPTION

First of all, some of the terms used in the present invention will be elucidated.

The application of a coating composition to a substrate, or the production of a coating film on a substrate, are understood as follows. The respective coating composition is applied in such a way that the coating film produced therefrom is arranged on the substrate, but need not necessarily be in direct contact with the substrate. Other layers, for example, may also be arranged between the coating film and the substrate. For example, in stage (1), the cured electrocoat (E.1) is produced on the metallic substrate (S), but a conversion coating as described below, such as a zinc phosphate coating, may also be arranged between the substrate and the electrocoat.

The same principle applies to the application of a coating composition (b) to a coating film (A) produced by means of another coating composition (a), or to the production of a coating film (B) on another coating film (A) arranged, for example, on the metallic substrate (S). The coating film (B) need not necessarily be in contact with the coating layer (A), but merely has to be arranged above it, i.e. on the side of the coating film (A) facing away from the metallic substrate.

In contrast, the application of a coating composition directly to a substrate, or the production of a coating film directly on a substrate, is understood as follows. The respective coating composition is applied in such a way that the coating film produced therefrom is arranged on the substrate and is in direct contact with the substrate. Thus, more particularly, no other layer is arranged between coating film and substrate. Of course, the same applies to the application of a coating composition (b) directly to a coating film (A) produced by means of another coating composition (a), or to the production of a coating film (B) directly on another coating film (A) arranged, for example, on the metallic substrate (S). In this case, the two coating films are in direct contact, i.e. are arranged directly one on top of the other. More particularly, there is no further layer between the coating films (A) and (B).

Of course, the same principle applies to directly successive application of coating compositions, or the production of directly successive coating films.

In the context of the present invention, "flashing off", "intermediately drying" and "curing" are understood to have the meanings familiar to the person skilled in the art in connection with methods for production of multicoat paint systems.

Thus, the term "flashing off" is understood in principle as a term for the vaporization, or permitting vaporization, of organic solvents and/or water in a coating composition applied in the production of a paint system, usually at ambient temperature (i.e. room temperature), for example 15 to 35° C. for a period of, for example, 0.5 to 30 min. During the flash-off operation, organic solvents and/or water present in the coating composition applied thus vaporize. Since the coating composition is still free-flowing at least directly after the application and on commencement of the flash-off operation, it can run during the flash-off operation. This is because at least a coating composition applied by spray application is generally applied in droplet form and not in homogeneous thickness. However, it is free-flowing by virtue of the organic solvents and/or water present and can thus form a homogeneous, smooth coating film by running. At the same time, organic solvents and/or water vaporize gradually, such that a comparatively smooth coating film has formed after the flash-off phase, containing less water and/or solvent compared to the coating composition applied. After the flash-off operation, the coating film, however, is still not in a state ready for use. For example, it is no longer free-flowing, but is still soft and/or tacky, and in some cases only partly dried. More particularly, the coating film still has not cured as described below.

Intermediate drying is thus likewise understood to mean vaporization, or permitting vaporization, of organic solvents and/or water in a coating composition applied in the production of a paint system, usually at a temperature elevated relative to ambient temperature, for example of 40 to 90° C., for a period of, for example, 1 to 60 min. In the intermediate drying operation too, the coating composition applied will thus lose a proportion of organic solvents and/or water. With regard to a particular coating composition, it is generally the case that the intermediate drying, compared to the flash-off, takes place at, for example, higher temperatures and/or for a longer period, such that, in comparison to the flash-off, a higher proportion of organic solvents and/or water escapes from the coating film applied. However, the intermediate drying does not give a coating film in a state ready for use either, i.e. a cured coating film as described below. A typical sequence of flash-off and intermediate drying operations would involve, for example, flashing off a coating film applied at ambient temperature for 5 min and then intermediately drying it at 80° C. for 10 min. However, no conclusive delimitation of the two terms is either necessary or intended. Purely for the sake of clarity, these terms are used to make it clear that a curing operation described below may be preceded by variable and sequential conditioning of a coating film in which—depending on the coating composition, the vaporization temperature and vaporization time—a higher or lower proportion of the organic solvents and/or water present in the coating composition can vaporize. As the case may be, a proportion of the polymers present in the coating compositions as binders, even at this early stage, can crosslink or interloop as described below. However, neither the flash-off nor the intermediate drying operation gives a ready-to-use coating film, as is accomplished by curing described below. Accordingly, curing is clearly delimited from the flash-off and intermediate drying operations.

Accordingly, curing of a coating film is understood to mean the conversion of such a film to the ready-to-use state, i.e. to a state in which the substrate provided with the respective coating film can be transported, stored and used as intended. More particularly, a cured coating film is no longer soft or tacky, but has been conditioned as a solid coating film which does not undergo any further significant change in its properties, such as hardness or adhesion on the substrate, even under further exposure to curing conditions as described below.

As is well known, coating compositions can in principle be cured physically and/or chemically, according to the components present, such as binders and crosslinking agents. In the case of chemical curing, thermochemical curing and actinochemical curing are options. If it is thermochemically curable, a coating composition may be self-crosslinking and/or externally crosslinking. The statement that a coating composition is self-crosslinking and/or externally crosslinking in the context of the present invention should be understood to mean that this coating composition comprises polymers as binders and optionally crosslinking agents, which can correspondingly crosslink with one another. The underlying mechanisms and usable binders and crosslinking agents are described below.

In the context of the present invention, "physically curable" or the term "physical curing" means the formation of a cured coating film through release of solvent from polymer solutions or polymer dispersions, the curing being achieved through interlooping of polymer chains.

In the context of the present invention, "thermochemically curable" or the term "thermochemical curing" means the crosslinking, initiated by chemical reaction of reactive functional groups, of a paint film (formation of a cured coating film), it being possible to provide the activation energy for these chemical reactions through thermal energy. This can involve reaction of different, mutually complementary functional groups with one another (complementary functional groups) and/or formation of the cured layer based on the reaction of autoreactive groups, i.e. functional groups which inter-react with groups of the same kind. Examples of suitable complementary reactive functional groups and autoreactive functional groups are known, for example, from German patent application DE 199 30 665 A1, page 7 line 28 to page 9 line 24.

This crosslinking may be self-crosslinking and/or external crosslinking. If, for example, the complementary reactive functional groups are already present in an organic polymer used as a binder, for example a polyester, a polyurethane or a poly(meth)acrylate, self-crosslinking is present. External crosslinking is present, for example, when a (first) organic polymer containing particular functional groups, for example hydroxyl groups, reacts with a crosslinking agent known per se, for example a polyisocyanate and/or a melamine resin. The crosslinking agent thus contains reactive functional groups complementary to the reactive functional groups present in the (first) organic polymer used as the binder.

Especially in the case of external crosslinking, the one-component and multicomponent systems, especially two-component systems, known per se are useful.

In one-component systems, the components to be crosslinked, for example organic polymers as binders and crosslinking agents, are present alongside one another, i.e. in one component. A prerequisite for this is that the components to be crosslinked react with one another, i.e. enter into curing reactions, only at relatively high temperatures of, for example, above 100° C. Otherwise, the components to be crosslinked would have to be stored separately from one another and only be mixed with one another shortly before application to a substrate, in order to avoid premature, at least partial thermochemical curing (cf. two-component systems). An example of a combination is that of hydroxy-functional polyesters and/or polyurethanes with melamine resins and/or blocked polyisocyanates as crosslinking agents.

In two-component systems, the components to be crosslinked, for example the organic polymers as binders and the crosslinking agents, are present separately in at least two components which are combined only shortly prior to application. This form is chosen when the components to be crosslinked react with one another even at ambient temperatures or slightly elevated temperatures of, for example, 40 to 90° C. An example of a combination is that of hydroxy-functional polyesters and/or polyurethanes and/or poly(meth)acrylates with free polyisocyanates as crosslinking agents.

It is also possible that an organic polymer as binder has both self-crosslinking and externally crosslinking functional groups, and is then combined with crosslinking agents.

In the context of the present invention, "actinochemically curable" or the term "actinochemical curing" is understood to mean the fact that curing is possible using actinic radiation, namely electromagnetic radiation such as near infrared (NIR) and UV radiation, especially UV radiation, and corpuscular radiation such as electron beams for curing. Curing by UV radiation is commonly initiated by radical or cationic photoinitiators. Typical actinically curable functional groups are carbon-carbon double bonds, for which generally free-radical photoinitiators are used. Actinic curing is thus likewise based on chemical crosslinking.

Of course, in the curing of a coating composition described as chemically curable, it is always also possible for physical curing to occur, i.e. interlooping of polymer chains. Nevertheless, such a coating composition is described as chemically curable in that case.

It follows from the above that, according to the nature of the coating composition and the components present therein, curing is brought about by different mechanisms which, of course, also necessitate different conditions in the curing, more particularly different curing temperatures and curing times.

In the case of a purely physically curing coating composition, curing is effected preferably between 15 and 90° C. over a period of 2 to 48 hours. In this case, curing may thus differ from the flash-off and/or intermediate drying operation merely by the duration of the conditioning of the coating film. Moreover, differentiation between flashing-off and intermediate drying is not meaningful. It would be possible, for example, first to flash off or intermediately dry a coating film produced by applying a physically curable coating composition at 15 to 35° C. for a period of, for example, 0.5 to 30 min, and then to keep it at 50° C. for a period of 5 hours.

Preferably, the coating compositions for use in the method of the invention, i.e. electrocoat materials, aqueous basecoat materials and clearcoat materials, however, are at least thermochemically curable, especially preferably thermochemically curable and externally crosslinking.

In principle, and within the context of the present invention, the curing of one-component systems is performed preferably at temperatures of 100 to 250° C., preferably 100 to 180° C., for a period of 5 to 60 min, preferably 10 to 45 min, since these conditions are generally necessary to convert the coating film to a cured coating film through chemical crosslinking reactions. Accordingly, any flash-off and/or intermediate drying phase which precedes the curing is effected at lower temperatures and/or for shorter periods. In such a case, for example, flashing-off can be effected at 15 to 35° C. for a period of, for example, 0.5 to 30 min, and/or intermediate drying at a temperature of, for example, 40 to 90° C. for a period of, for example, 1 to 60 min.

In principle, and within the context of the present invention, the curing of two-component systems is performed at temperatures of, for example, 15 to 90° C., preferably 40 to 90° C., for a period of 5 to 80 min, preferably 10 to 50 min. Accordingly, any flash-off and/or intermediate drying phase which precedes the curing is effected at lower temperatures and/or for shorter periods. In such a case, for example, it is no longer meaningful to distinguish between the terms "flash-off" and "intermediate drying". Any flash-off and/or intermediate drying phase which precedes the curing may proceed, for example, at 15 to 35° C. for a period of, for example, 0.5 to 30 min, but at least at lower temperatures and/or for shorter periods than the curing which then follows.

This of course does not rule out curing of a two-component system at higher temperatures. For example, in step (4) of the method of the invention, which is described in detail below, a basecoat or a plurality of basecoats is/are cured together with a clearcoat. If both one-component and two-component systems are present within the films, for example a one-component basecoat and a two-component clearcoat, the joint curing is of course guided by the curing conditions needed for the one-component system.

All the temperatures exemplified in the context of the present invention are understood as the temperature of the room in which the coated substrate is present. What is thus not meant is that the substrate itself must have the particular temperature.

If reference is made in the context of the present invention to an official standard without reference to the official period of validity, this of course means the version of the standard current at the filing date or, if no current version exists at this date, the last current version.

The Method of the Invention

In the method of the invention, a multicoat paint system is formed on a metallic substrate (S).

Useful metallic substrates (S) include, in principle, substrates comprising or consisting of, for example, iron, aluminum, copper, zinc, magnesium and alloys thereof, and steel in a wide variety of different forms and compositions. Preference is given to iron and steel substrates, for example typical iron and steel substrates as used in the automobile industry. The substrates may in principle be in any form, meaning that they may, for example, be simple sheets or else complex components, such as, more particularly, automobile bodies and parts thereof.

Prior to stage (1) of the method of the invention, the metallic substrates (S) can be pretreated in a manner known per se, i.e., for example, cleaned and/or provided with known conversion coatings. Cleaning can be effected mechanically, for example by means of wiping, grinding and/or polishing, and/or chemically by means of etching methods by surface etching in acid or alkali baths, for example by means of hydrochloric acid or sulfuric acid. Of course, cleaning with organic solvents or aqueous detergents is also possible. Pretreatment by application of conversion coatings, especially by means of phosphation and/or chromation, preferably phosphation, may likewise take place. Preferably, the metallic substrates are at least conversion-coated, especially phosphated, preferably by a zinc phosphation.

In stage (1) of the method of the invention, a cured electrocoat (E.1) is produced on the metallic substrate (S) by electrophoretic application of an electrocoat material (e.1) to the substrate (S) and subsequent curing of the electrocoat material (e.1).

The electrocoat material (e.1) used in stage (1) of the method of the invention may be a cathodic or anodic electrocoat material. It is preferably a cathodic electrocoat material. Electrocoat materials have long been known to those skilled in the art. These are aqueous coating materials comprising anionic or cationic polymers as binders. These polymers contain functional groups which are potentially anionic, i.e. can be converted to anionic groups, for example carboxylic acid groups, or functional groups which are potentially cationic, i.e. can be converted to cationic groups, for example amino groups. The conversion to charged groups is generally achieved through the use of appropriate neutralizing agents (organic amines (anionic), organic carboxylic acids such as formic acid (cationic)), which then gives rise to the anionic or cationic polymers. The electrocoat materials generally, and thus preferably additionally, comprise typical anticorrosion pigments. The cathodic electrocoat materials preferred in the context of the invention comprise preferably cationic polymers as binders, especially hydroxy-functional polyether amines, which preferably have aromatic structural units. Such polymers are generally obtained by reaction of appropriate bisphenol-based epoxy resins with amines, for example mono- and dialkylamines, alkanolamines and/or dialkylaminoalkylamines. These polymers are especially used in combination with blocked polyisocyanates known per se. Reference is made by way of example to the electrocoat materials described in WO 9833835 A1, WO 9316139 A1, WO 0102498 A1 and WO 2004018580 A1.

The electrocoat material (e.1) is thus preferably an at least thermochemically curable coating material, and is especially externally crosslinking. The electrocoat material (e.1) is preferably a one-component coating composition. Preferably, the electrocoat material (e.1) comprises a hydroxy-functional epoxy resin as a binder and a fully blocked polyisocyanate as a crosslinking agent. The epoxy resin is preferably cathodic, and especially contains amino groups.

The electrophoretic application of such an electrocoat material (e.1) which takes place in stage (1) of the method of the invention is also known. The application proceeds by electrophoresis. This means that metallic workpiece to be coated is first dipped into a dip bath containing the coating material, and an electrical DC field is applied between the metallic workpiece and a counterelectrode. The workpiece thus functions as an electrode; the nonvolatile constituents of the electrocoat material migrate, because of the described charge of the polymers used as binders, through the electrical field to the substrate and are deposited on the substrate, forming a electrocoat film. For example, in the case of a cathodic electrocoat, the substrate is thus connected as the cathode, and the hydroxide ions which form there through water electrolysis neutralize the cationic binder, such that it is deposited on the substrate and forms an electrocoat layer. In that case, application is thus accomplished through the electrophoretic dipping method.

After the electrolytic application of the electrocoat material (e.1), the coated substrate (S) is removed from the bath, optionally rinsed off with, for example, water-based rinse solutions, then optionally flashed off and/or intermediately dried, and the electrocoat material applied is finally cured.

The electrocoat material (e.1) applied (or the as yet uncured electrocoat applied) is flashed off, for example, at 15 to 35° C. for a period of, for example, 0.5 to 30 min and/or intermediately dried at a temperature of preferably 40 to 90° C. for a period of, for example, 1 to 60 min.

The electrocoat material (e.1) applied to the substrate (or the as yet uncured electrocoat applied) is preferably cured at temperatures of 100 to 250° C., preferably 140 to 220° C., for a period of 5 to 60 min, preferably 10 to 45 min, which produces the cured electrocoat (E.1).

The flash-off, intermediate drying and curing conditions specified apply especially to the preferred case that the electrocoat material (e.1) is a one-component coating composition thermochemically curable as described above. However, this does not rule out the possibility that the electrocoat material is a coating composition curable in another way and/or that other flash-off, intermediate drying and curing conditions are used.

The layer thickness of the cured electrocoat is, for example, 10 to 40 micrometers, preferably 15 to 25 micrometers. All the film thicknesses stated in the context of the present invention should be understood as dry film thicknesses. The film thickness is thus that of the cured film in question. Thus, if it is stated that a coating material is applied in a particular film thickness, this should be understood to mean that the coating material is applied such that the stated film thickness results after the curing.

In stage (2) of the method of the invention, (2.1) a basecoat (B.2.1) is produced or (2.2) a plurality of directly successive basecoats (B.2.2.x) are produced. The coats are produced by applying (2.1) an aqueous basecoat material (b.2.1) directly to the cured electrocoat (E.1) or (2.2) directly successively applying a plurality of basecoat materials (b.2.2.x) to the cured electrocoat (E.1).

The directly successive application of a plurality of basecoat materials (b.2.2.x) to the cured electrocoat (E.1) is thus understood to mean that a first basecoat material is first applied directly to the electrocoat and then a second basecoat material is applied directly to the coat of the first basecoat material. Any third basecoat material is then applied directly to the coat of the second basecoat material. This operation can then be repeated analogously for further basecoat materials (i.e. a fourth, fifth, etc. basecoat).

The basecoat (B.2.1) or the first basecoat (B.2.2.x), after the production, is thus arranged directly on the cured electrocoat (E.1).

The terms "basecoat material" and "basecoat" in relation to the coating compositions applied and coating films produced in stage (2) of the method of the invention are used for the sake of better clarity. The basecoats (B.2.1) and (B.2.2.x) are not cured separately, but rather are cured together with the clearcoat material. The curing is thus effected analogously to the curing of so-called basecoat materials used in the standard method described by way of introduction. More particularly, the coating compositions used in stage (2) of the method of the invention are not cured separately, like the coating compositions referred to as primer-surfacers in the context of the standard method.

The aqueous basecoat material (b.2.1) used in stage (2.1) is described in detail below. However, it is preferably at least thermochemically curable, and it is especially externally crosslinking. Preferably, the basecoat material (b.2.1) is a one-component coating composition. Preferably, the basecoat material (b.2.1) comprises a combination of at least one hydroxy-functional polymer as a binder, selected from the group consisting of polyurethanes, polyesters, polyacrylates and copolymers of the polymers mentioned, for example polyurethane-polyacrylates, and at least one melamine resin as a crosslinking agent.

The basecoat material (b.2.1) can be applied by methods known to those skilled in the art for application of liquid coating compositions, for example by dipping, bar coating, spraying, rolling or the like. Preference is given to employing spray application methods, for example compressed air spraying (pneumatic application), airless spraying, high-speed rotation, electrostatic spray application (ESTA), optionally in association with hot-spray application, for example hot-air spraying. Most preferably, the basecoat material (b.2.1) is applied by means of pneumatic spray application or electrostatic spray application. The application of the basecoat material (b.2.1) thus produces a basecoat (B.2.1), i.e. a coat of the basecoat material (b.2.1) applied directly to the electrocoat (E.1).

After application, the basecoat material (b.2.1) applied, or the corresponding basecoat (B2.1) is flashed off, for example, at 15 to 35° C. for a period of, for example, 0.5 to min and/or intermediately dried at a temperature of preferably 40 to 90° C. for a period of, for example, 1 to 60 min. Preference is given to first flashing off at 15 to 35° C. for a period of 0.5 to 30 min and then intermediately drying at 40 to 90° C. for a period of, for example, 1 to 60 min. The flash-off and intermediate drying conditions described apply especially to the preferred case that the basecoat material (b.2.1) is a thermochemically curable one-component coating composition. However, this does not rule out the possibility that the basecoat material (b.2.1) is a coating composition curable in another way and/or that other flash-off and/or intermediate drying conditions are used.

The basecoat (B.2.1) is not cured within stage (2) of the method of the invention, i.e. is preferably not exposed to temperatures of more than 100° C. for a period of longer than 1 min, and especially preferably is not exposed to temperatures of more than 100° C. at all. This is clearly and unambiguously apparent from stage (4) of the method of the invention, described below. Since the basecoat is not cured until stage (4), it cannot be cured at the earlier stage (2), since curing in stage (4) would not be possible in that case.

The aqueous basecoat materials (b.2.2.x) used in stage (2.2) of the method of the invention are also described in detail below. At least one of the basecoat materials (b.2.2.x) used in stage (2.2), preferably all of those used in stage (2.2), however, are preferably at least thermochemically curable, especially preferably externally crosslinking. Preferably, at least one basecoat material (b.2.2.x) is a one-component coating composition; this preferably applies to all the basecoat materials (b.2.2.x). Preferably, at least one of the basecoat materials (b.2.2.x) comprises a combination of at least one hydroxy-functional polymer as a binder, selected from the group consisting of polyurethanes, polyesters, polyacrylates and copolymers of the polymers mentioned, for example polyurethane-polyacrylates, and at least one melamine resin as a crosslinking agent. This preferably applies to all the basecoat materials (b.2.2.x).

The basecoat materials (b.2.2.x) can be applied by methods known to those skilled in the art for application of liquid coating compositions, for example by dipping, bar coating, spraying, rolling or the like. Preference is given to employing spray application methods, for example compressed air spraying (pneumatic application), airless spraying, high-speed rotation, electrostatic spray application (ESTA), optionally in association with hot-spray application, for example hot-air (hot spraying). Most preferably, the basecoat materials (b.2.2.x) are applied by means of pneumatic spray application and/or electrostatic spray application.

In stage (2.2) of the method of the invention, the naming system which follows is suggested. The basecoat materials and basecoats are generally designated by (b.2.2.x) and (B.2.2.x), while the x can be replaced by other appropriate letters in the naming of the specific individual basecoat materials and basecoats.

The first basecoat material and the first basecoat can be designated by a, and the uppermost basecoat material and the uppermost basecoat can be designated by z. These two basecoat materials or basecoats are always present in stage (2.2). Any coats arranged in between can be designated serially with b, c, d and so forth.

The application of the first basecoat material (b.2.2.a) thus produces a basecoat (B.2.2.a) directly on the cured electrocoat (E.1). The at least one further basecoat (B.2.2.x) is then produced directly on the basecoat (B.2.2.a). If a plurality of further basecoats (B.2.2.x) are produced, these are produced in direct succession. For example, it is possible for exactly one further basecoat (B.2.2.x) to be produced, in which case this is then arranged directly below the clearcoat (K) in the multicoat paint system ultimately produced, and can thus be referred to as the basecoat (B.2.2.z) (cf. also FIG. 2). It is also possible, for example, that two further basecoats (B.2.2.x) are produced, in which case the coat produced directly on the basecoat (B.2.2.a) can be designated as (B.2.2.b), and the coat finally arranged directly below the clearcoat (K) in turn as (B.2.2.z) (cf. also FIG. 3).

The basecoat materials (b.2.2.x) may be identical or different. It is also possible to produce a plurality of basecoats (B.2.2.x) with the same basecoat material, and one or more further basecoats (B.2.2.x) with one or more other basecoat materials.

The basecoat materials (b.2.2.x) applied are generally flashed off and/or intermediately dried separately and/or together. In stage (2.2) too, preference is given to flashing off at 15 to 35° C. for a period of 0.5 to 30 min and intermediately drying at 40 to 90° C. for a period of, for example, 1 to 60 min. The sequence of flash-off and/or intermediate drying operations on individual or plural basecoats (B.2.2.x) can be adjusted according to the demands of the individual case. The above-described preferred flash-off and intermediate drying conditions apply especially to the preferred case that at least one basecoat material (b.2.2.x), preferably all the basecoat materials (b.2.2.x), comprise(s) thermochemically curable one-component coating compositions. However, this does not rule out the possibility that the basecoat materials (b.2.2.x) are coating compositions curable in another way and/or that other flash-off and/or intermediate drying conditions are used.

Some preferred variants of the basecoat sequences of the basecoat materials (b.2.2.x) are elucidated as follows.

Variant a) It is possible to produce a first a basecoat by electrostatic spray application (ESTA) of a first basecoat material, and to produce a further basecoat directly on the first basecoat by pneumatic spray application of the same basecoat material. Although the two basecoats are thus based on the same basecoat material, the application is obviously effected in two stages, such that the basecoat material in question in the method of the invention corresponds to a first basecoat material (b.2.2.a) and a further basecoat material (b.2.2.z). Before the pneumatic application, the first basecoat is preferably flashed off briefly, for example at 15 to 35° C. for 0.5 to 3 min. After the pneumatic application, flash-off is then effected at, for example, 15 to 35° C. for 0.5 to 30 min, and then intermediate drying at 40 to 90° C. for a period of 1 to 60 min. The structure described is frequently also referred to as a one-coat basecoat structure produced in two applications (once by ESTA, once pneumatically). Since, however, especially in real OEM finishing, the technical circumstances in a painting facility mean that a certain timespan always passes between the first application and the second application, in which the substrate, for example the automobile body, is conditioned at 15 to 35° C., for example, and hence is flashed off, the characterization of this structure as a two-coat basecoat structure is clearer in a formal sense. This variant of stage (2.2) is preferably chosen when the basecoat material (b.2.2.x) used (or the two identical basecoat materials (b.2.2.a) and (b.2.2.z) used) comprises effect pigments as described below. While ESTA application can guarantee good material transfer or only a small paint loss in the application, the pneumatic application which then follows achieves good alignment of the effect pigments and hence good properties of the overall paint system, especially a high flop.

Variant b) It is also possible to produce a first basecoat by electrostatic spray application (ESTA) of a first basecoat material directly on the cured electrocoat, to flash off and/or intermediately dry said first basecoat material, and then to produce a second basecoat by direct application of a second basecoat material other than the first basecoat material. In this case, the second basecoat material can also, as described in variant a), be applied first by electrostatic spray application (ESTA) and then by pneumatic spray application, as a result of which two directly successive basecoats, both based on the second basecoat material, are produced directly on the first basecoat. Between and/or after the applications, flashing-off and/or intermediate drying is of course again possible. Variant (b) of stage (2.2) is preferably selected when a color-preparing basecoat as described below is first to be produced directly on the electrocoat and then, in turn, a double application of a basecoat material comprising effect pigments or an application of a basecoat material comprising chromatic pigments is to be effected. In that case, the first basecoat is based on the color-preparing basecoat material, the second and third basecoats on the basecoat material comprising effect pigments, or the one further basecoat on a further basecoat material comprising chromatic pigments.

Variant c) It is likewise possible to produce three basecoats directly in succession directly on the cured electrocoat, in which case the basecoats are based on three different basecoat materials. For example, it is possible to produce a color-preparing basecoat, a further coat based on a basecoat material comprising color pigments and/or effect pigments, and a further coat based on a second basecoat material comprising color pigments and/or effect pigments. Between and/or after the individual applications, and/or after all three applications, it is again possible to flash off and/or intermediately dry.

Embodiments preferred in the context of the present invention thus include production of two or three basecoats in stage (2.2) of the method of the invention, and preference is given in this context to production of two directly successive basecoats using the same basecoat material, and very particular preference to production of the first of these two basecoats by ESTA application and the second of these two basecoats by pneumatic application. In that case, it is preferable in the case of production of a three-coat basecoat structure that the basecoat produced directly on the cured electrocoat is based on a color-preparing basecoat material. The second and third coats are based either on one and the same basecoat material, which preferably comprises effect pigments, or on a first basecoat material comprising color pigments and/or effect pigments and a different second basecoat material comprising color pigments and/or effect pigments.

The basecoats (B.2.2.x) are not cured within stage (2) of the method of the invention, i.e. are preferably not exposed to temperatures of more than 100° C. for a period of longer than 1 min, and preferably are not exposed to temperatures of more than 100° C. at all. This is clearly and unambiguously apparent from stage (4) of the method of the invention, described below. Since the basecoats are not cured until stage (4), they cannot be cured at the earlier stage (2), since curing in stage (4) would not be possible in that case.

The application of the basecoat materials (b.2.1) and (b.2.2.x) is effected in such a way that the basecoat (B.2.1) and the individual basecoats (B.2.2.x), after the curing effected in stage (4), have a coat thickness of, for example, 5 to 40 micrometers, preferably 6 to 35 micrometers, especially preferably 7 to 30 micrometers. In stage (2.1), preferably higher coat thicknesses of 15 to 40 micrometers, preferably 20 to 35 micrometers, are produced. In stage (2.2), the individual basecoats have, if anything, comparatively lower coat thicknesses, in which case the overall structure again has coat thicknesses within the order of magnitude of the one basecoat (B.2.1). For example, in the case of two basecoats, the first basecoat (B.2.2.a) preferably has coat thicknesses of 5 to 35 and especially 10 to 30 micrometers, and the second basecoat (B.2.2.z) preferably has coat thicknesses of 5 to 30 micrometers, especially 10 to 25 micrometers.

In stage (3) of the method of the invention, a clearcoat (K) is applied directly to (3.1) the basecoat (B.2.1) or (3.2) the uppermost basecoat (B.2.2.z). This production is effected by appropriate application of a clearcoat material (k).

The clearcoat material (k) may in principle be any transparent coating composition known to the person skilled in the art in this context. This includes aqueous or solventborne transparent coating compositions, which may be formulated either as one-component or two-component coating compositions, or multicomponent coating compositions. In addition, powder slurry clearcoat materials are also suitable. Preference is given to solvent-based clearcoat materials.

The clearcoat materials (k) used may especially be thermochemically and/or actinochemically curable. More particularly, they are thermochemically curable and externally crosslinking. Preference is given to two-component clearcoat materials.

The transparent coating compositions thus typically and preferably comprise at least one (first) polymer as a binder having functional groups, and at least one crosslinker having a functionality complementary to the functional groups of the binder. Preference is given to using at least one hydroxy-functional poly(meth)acrylate polymer as a binder and a polyisocyanate as a crosslinking agent.

Suitable clearcoat materials are described, for example, in WO 2006042585 A1, WO 2009077182 A1 or else WO 2008074490 A1.

The clearcoat material (k) is applied by methods known to those skilled in the art for application of liquid coating compositions, for example by dipping, bar coating, spraying, rolling or the like. Preference is given to employing spray application methods, for example compressed air spraying (pneumatic application), and electrostatic spray application (ESTA).

After application, the clearcoat material (k) or the corresponding clearcoat (K) is flashed off or intermediately dried at 15 to 35° C. for a period of 0.5 to 30 min. Flash-off and intermediate drying conditions of this kind apply especially to the preferred case that the clearcoat material (k) is a thermochemically curable two-component coating composition. However, this does not rule out the possibility that the clearcoat material (k) is a coating composition curable in another way and/or that other flash-off and/or intermediate drying conditions are used.

The application of the clearcoat material (k) is effected in such a way that the clearcoat, after the curing effected in stage (4), has a coat thickness of, for example, 15 to 80 micrometers, preferably 20 to 65 micrometers, especially preferably 25 to 60 micrometers.

In stage (4) of the method of the invention, there is joint curing of (4.1) the basecoat (B.2.1) and the clearcoat (K) or (4.2) the basecoats (B.2.2.x) and the clearcoat (K).

The joint curing is preferably effected at temperatures of 100 to 250° C., preferably 100 to 180° C., for a period of 5 to 60 min, preferably 10 to 45 min. Curing conditions of this kind apply especially to the preferred case that the basecoat (3.2.1) or at least one of the basecoats (B.2.2.x), preferably all the basecoats (B.2.2.x), is/are based on a thermochemically curable one-component coating composition. This is because, as described above, such conditions are generally required to achieve curing as described above in such a one-component coating composition. If the clearcoat material (k) is, for example, likewise a thermochemically curable one-component coating composition, the clearcoat (K) in question is of course likewise cured under these conditions. The same obviously applies to the preferred case that the clearcoat material (k) is a thermochemically curable two-component coating composition.

However, the above statements do not rule out the possibility that the basecoat materials (b.2.1) and (b.2.2.x) and the clearcoat materials (k) are coating compositions curable in another way and/or that other curing conditions are used.

After stage (4) of the method of the invention has ended, the result is a multicoat paint system of the invention.

The Basecoat Materials for Use in Accordance with the Invention

The basecoat material (b.2.1) for use in accordance with the invention comprises a specific aqueous dispersion comprising at least one specific copolymer (CP), preferably exactly one copolymer (CP).

A copolymer in the context of the present invention refers to polymers formed from different polymer types, for example a polyurethane and a (meth)acrylate polymer. This explicitly includes both polymers covalently bonded to one another and those in which the various polymers are bonded to one another by adhesion. Combinations of both kinds of bonding are also covered by this definition. The term "(meth)acrylate" covers acrylates, methacrylates and mixtures thereof.

The copolymer (CP) is preparable by
(i) initially charging an aqueous dispersion of at least one polyurethane, and then
(ii) polymerizing a mixture of olefinically unsaturated monomers in the presence of the polyurethane from (i), in which
  a. a water-soluble initiator is used,
  b. the olefinically unsaturated monomers are metered in such that a concentration of 6.0% by weight, based on the total amount of olefinically unsaturated monomers used for polymerization, in the reaction solution is not exceeded over the entire reaction time, and
  c. the mixture of the olefinically unsaturated monomers comprises at least one polyolefinically unsaturated monomer.

In the first preparation step, an aqueous dispersion of a polyurethane resin is initially charged.

Suitable saturated or unsaturated polyurethane resins are described, for example, in
  German patent application DE 199 48 004 A1, page 4 line 19 to page 11 line 29 (polyurethane prepolymer B1),
  European patent application EP 0 228 003 A1, page 3 line 24 to page 5 line 40,
  European patent application EP 0 634 431 A1, page 3 line 38 to page 8 line 9, or
  international patent application WO 92/15405, page 2 line 35 to page 10 line 32.

The polyurethane resin is prepared using firstly, preferably, the aliphatic, cycloaliphatic, aliphatic-cycloaliphatic, aromatic, aliphatic-aromatic and/or cycloaliphatic-aromatic polyisocyanates known to those skilled in the art. Particular preference is given to aliphatic and aliphatic-cycloaliphatic polyurethane resins.

The alcohol components used for the preparation of the polyurethane resins are preferably the saturated and unsaturated polyols known to those skilled in the art, and optionally, in minor amounts, also monoalcohols. More particularly, diols and, optionally in minor amounts, triols are used to introduce branches. Examples of suitable polyols are saturated or olefinically unsaturated polyester polyols and/or polyether polyols. More particularly, the polyols used are polyester polyols, especially those having a number-average molecular weight of 400 to 5000 g/mol. Unless specifically indicated otherwise, the number-average molecular weight in the context of the present invention is determined by means of vapor pressure osmosis. Measurement was effected using a vapor pressure osmometer (model 10.00 from Knauer) on concentration series of the component under investigation in toluene at 50° C., with benzophenone as calibration substance for determination of the experimental calibration constant of the instrument employed (in accordance with E. Schröder, G. Müller, K.-F. Arndt, "Leitfaden der Polymercharakterisierung", Akademie-Verlag, Berlin, pp. 47-54, 1982, in which benzil was used as calibration substance).

The polyurethane initially charged in aqueous dispersion is preferably a hydrophilically stabilized polyurethane. For hydrophilic stabilization and/or to increase dispersibility in aqueous medium, the polyurethane resin preferably present may contain particular ionic groups and/or groups which can be converted to ionic groups (potentially ionic groups). Polyurethane resins of this kind are referred to in the context of the present invention as ionically hydrophilically stabilized polyurethane resins. Likewise present may be nonionic hydrophilically modifying groups. Preferred, however, are the ionically hydrophilically stabilized polyurethanes. In more precise terms, the modifying groups are alternatively functional groups which can be converted to cations by neutralizing agents and/or quaternizing agents, and/or cationic groups (cationic modification)

or functional groups which can be converted to anions by neutralizing agents, and/or anionic groups (anionic modification)

or nonionic hydrophilic groups (nonionic modification)

or combinations of the aforementioned groups.

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted to cationic groups by neutralizing agents and/or quaternizing agents). Mention should also be made of the cationic groups—groups prepared from the aforementioned functional groups using neutralizing agents and/or quaternizing agents known to those skilled in the art—such as primary, secondary, tertiary and/or quaternary ammonium groups, tertiary sulfonium groups and/or quaternary phosphonium groups, more particularly quaternary ammonium groups and tertiary sulfonium groups.

As is well known, the functional groups for anionic modification are, for example, carboxylic acid, sulfonic acid and/or phosphonic acid groups, more particularly carboxylic acid groups (functional groups which can be converted to anionic groups by neutralizing agents), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the ionic or potentially ionic groups. The nonionic modifications are introduced, for example, through the incorporation of poly(ethylene) oxide polymers as lateral or terminal groups in the polyurethane molecules. The hydrophilic modifications are introduced, for example, via compounds which contain at least one group reactive toward isocyanate groups, preferably at least one hydroxyl group. The ionic modification can be introduced using monomers which, as well as the modifying groups, contain at least one hydroxyl group. To introduce the nonionic modifications, preference is given to using the polyether diols and/or alkoxypoly(oxyalkylene) alcohols known to those skilled in the art.

Preference is given to adding at least one organic solvent to the initially charged polyurethane dispersion, said organic solvent preferably being miscible in any ratio with water and in any ratio with the mixture of olefinically unsaturated monomers. Suitable organic solvents are N-methylpyrrolidone, N-ethylpyrrolidone and ether alcohols, such as methoxypropanol in particular, though it should be noted that pyrrolidone-based solvents may be dispensed with for environmental reasons alone. However, the amount of the organic solvent is selected such that the aqueous character of the dispersion is conserved.

In the second preparation step, a polymerization of a mixture of olefinically unsaturated monomers in the presence of a polyurethane is conducted by the methods of what is called free-radical emulsion polymerization in the presence of at least one polymerization initiator.

The polymerization initiator used has to be a water-soluble initiator. Examples of suitable initiators are potassium peroxodisulfate, sodium peroxodisulfate or ammonium peroxodisulfate, and also hydrogen peroxide, tert-butyl hydroperoxide, 2,2'-azobis(2-amidoisopropane) dihydrochloride, 2,2'-azobis(N,N'-dimethylenisobutyramidine) dihydrochloride or 2,2'-azobis(4-cyano)pentanoic acid. The initiators are used either alone or in a mixture, for example mixtures of hydrogen peroxide and sodium persulfate.

The known redox initiator systems can also be used as polymerization initiators. Such redox initiator systems comprise at least one peroxide-containing compound in combination with a redox coinitiator, for example reducing sulfur compounds, for example bisulfites, sulfites, thiosulfates, dithionites and tetrathionates of alkali metals and ammonium compounds, sodium hydroxymethanesulfinate dihydrate and/or thiourea. For instance, it is possible to use combinations of peroxodisulfates with alkali metal or ammonium hydrogensulfites, for example ammonium peroxodisulfate and ammonium disulfite. The weight ratio of peroxide-containing compounds to the redox coinitiators is preferably 50:1 to 0.05:1. In combination with the initiators or the redox initiator systems, it is additionally possible to use transition metal catalysts, for example iron salts, nickel salts, cobalt salts, manganese salts, copper salts, vanadium salts or chromium salts, such as iron(II) sulfate, cobalt(II) chloride, nickel(II) sulfate, copper(I) chloride, manganese (II) acetate, vanadium(III) acetate, manganese(II) chloride. Based on the monomers, these transition metal salts are typically used in amounts of 0.1 to 1000 ppm. For instance, it is possible to use combinations of hydrogen peroxide with iron(II) salts, for example 0.5 to 30% hydrogen peroxide and 0.1 to 500 ppm of Mohr's salt.

The initiators are preferably used in an amount of 0.05 to 20% by weight, preferably 0.05 to 10%, more preferably of 0.1 to 5% by weight, based on the total weight of the olefinically unsaturated monomers used for polymerization. The terms "total amount" and "total weight" are equivalent.

The result of the use of the water-soluble initiator is that olefinically unsaturated monomers which are added to the aqueous dispersion initially charged can react immediately to give oligomers. These oligomers have a lesser tendency to penetrate into the polyurethane particles of the dispersion initially charged than the smaller monomers.

The polymerization is appropriately conducted, for example, at a temperature of greater than 0 to 160° C., preferably 60 to 95° C.

Preference is given to working under exclusion of oxygen, preferably in a nitrogen stream. In general, the polymerization is performed at standard pressure, but it is also possible to employ lower pressures or higher pressures, especially when polymerization temperatures above the boiling point of the monomers and/or of the organic solvents are employed.

The copolymers (CP) for use in accordance with the invention are prepared by free-radical aqueous emulsion polymerization, in which case surfactants or protective colloids can be added to the reaction medium. A list of suitable emulsifiers and protective colloids is given, for example, in Houben Weyl, Methoden der organischen Chemie [Methods of Organic Chemistry], volume XIV/1 Makromolekulare Stoffe [Macromolecular Substances], Georg Thieme Verlag, Stuttgart 1961, p. 411 ff.

An important factor for the preparation of the aqueous dispersions for use in accordance with the invention, comprising the copolymer (CP), is the control of the conditions of the polymerization reaction of the mixture of olefinically unsaturated monomers in the presence of the polyurethane. This is conducted in the manner of what is called a "starve feed", "starve fed" or "starved feed" polymerization.

A starved feed polymerization in the context of the present invention is considered to be an emulsion polymerization in which the content of residual monomers in the reaction solution is minimized during the reaction time, meaning that the metered addition of the olefinically unsaturated monomers is effected in such a way that a concentration of 6.0% by weight, preferably 5.0% by weight, more preferably 4.0% by weight, particularly advantageously 3.5% by weight, based in each case on the total amount of olefinically unsaturated monomers used for polymerization, is not exceeded over the entire reaction time. In this context, further preference is given to concentration ranges of the olefinically unsaturated monomers of 0.01 to 6.0% by weight, preferably 0.02 to 5.0% by weight, more preferably 0.03 to 4.0% by weight, especially 0.05 to 3.5% by weight, based in each case on the total amount of olefinically unsaturated monomers used for polymerization. For example, the highest proportion (or concentration) detectable during the reaction may be 0.5% by weight, 1.0% by weight, 1.5% by weight, 2.0% by weight, 2.5% by weight or 3.0% by weight, while all further values detected are then below the values specified here. The term "concentration" in this context is thus obviously equivalent to the term "proportion".

The concentration of the monomers in the reaction solution, referred to hereinafter as free monomers, can be controlled in various ways.

One way of minimizing the concentration of the free monomers is to select a very low metering rate for the mixture of olefinically unsaturated monomers. When the rate of metered addition is so low that all monomers can react very quickly as soon as they are in the reaction solution, it is possible to ensure that the concentration of the free monomers is minimized.

As well as the metering rate, it is important that sufficient free radicals are always present in the reaction solution, so that the monomers metered in can each be reacted very rapidly. For this purpose, reaction conditions should preferably be selected such that the initiator feed is already commenced prior to commencement of the metered addition of the olefinically unsaturated monomers. Preferably, the metered addition is commenced at least 5 minutes beforehand, more preferably at least 10 minutes beforehand. Preferably at least 10% by weight of the initiator, more preferably at least 20% by weight, most preferably at least 30% by weight of the initiator, based in each case on the total amount of initiator, are added prior to commencement of the metered addition of the olefinically unsaturated monomers.

The amount of initiator is an important factor for the sufficient presence of free radicals in the reaction solution. The amount of initiator should be selected such that sufficient free radicals are available at any time, so that the monomers metered in can react. If the amount of initiator is increased, it is also possible to react greater amounts of monomers at the same time.

A further factor which can determine the reaction rate is the structure of the monomers, i.e. particularly the structural properties thereof and the reactivity which derives therefrom.

The concentration of the free monomers can thus be controlled through the interplay of the amount of initiator, rate of initiator addition, rate of monomer addition, and through the choice of monomers. Both the slowing of the metered addition and the increase in the amount of initiator, and also the early commencement of the addition of the initiator, serve the particular aim of keeping the concentration of the free monomers below the abovementioned limits.

The concentration of the monomers in the reaction solution can be determined by gas chromatography at any juncture in the reaction. Typical parameters for the gas chromatography determination are as follows: 50 m silica capillary column with polyethylene glycol phase or 50 m silica capillary column with polydimethylsiloxane phase, helium carrier gas, split injector 150° C., oven temperature 40 to 220° C., flame ionization detector, detector temperature 275° C., internal standard: isobutyl acrylate. In the context of the present invention, the concentration of the monomers is preferably determined by gas chromatography, especially while observing the abovementioned parameters.

Should this analysis determine a concentration of free monomers close to the limit for the starved feed polymerization, for example because of a high proportion of olefinically unsaturated monomers having a low reactivity, the abovementioned parameters can be utilized to control the reaction. In this case, for example, the metering rate of the monomers can be reduced and/or the amount of initiator can be increased.

Suitable olefinically unsaturated monomers may be mono- or polyolefinically unsaturated. Preferably, at least one monoolefinically unsaturated and at least one polyolefinically unsaturated monomer are present.

Examples of suitable monoolefinically unsaturated monomers include vinylic monoolefinically unsaturated monomers, such as especially (meth)acrylate-based monoolefinically unsaturated monomers and allyl compounds. Examples are also alpha,beta-unsaturated carboxylic acids. Preference is given to using at least, but not necessarily exclusively, (meth)acrylate-based monoolefinically unsaturated monomers.

The (meth)acrylate-based, monoolefinically unsaturated monomers may, for example, be (meth)acrylic acid and esters, nitriles or amides of (meth)acrylic acid.

Preference is given to esters of (meth)acrylic acid having a non-olefinically unsaturated R radical.

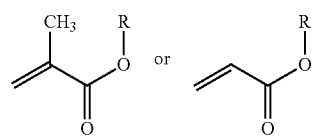

The R radical may be aliphatic or aromatic. The R radical is preferably aliphatic.

The R radical may, for example, be an alkyl radical, or contain heteroatoms. Examples of R radicals containing heteroatoms are ethers. Preference is given to using at least, but not necessarily exclusively, monomers in which the R radical is an alkyl radical.

If R is an alkyl radical, it may, for example, be a linear, branched or cyclic alkyl radical. In all three cases, it may comprise unsubstituted alkyl radicals or alkyl radicals substituted by functional groups. The alkyl radical has preferably 1 to 20, more preferably 1 to 10, carbon atoms.

Particularly preferred monounsaturated esters of (meth) acrylic acid having an unsaturated alkyl radical are methyl (meth)acrylate, ethyl (meth)acrylate, propyl (meth)acylate, isopropyl (meth)acylate, n-butyl (meth)acrylate, isobutyl (meth)acrylate, tert-butyl (meth)acrylate, amyl (meth)acrylate, hexyl (meth)acrylate, ethylhexyl (meth)acrylate, 3,3,5-trimethylhexyl (meth)acrylate, stearyl (meth)acrylate, lauryl (meth)acrylate, cycloalkyl (meth)acrylates such as cyclopentyl (meth)acrylate, isobornyl (meth)acrylate and cyclohexyl (meth)acrylate, very particular preference being given to n- and tert-butyl (meth)acrylate and methyl methacrylate.

Suitable monounsaturated esters of (meth)acrylic acid having a substituted alkyl radical may preferably be substituted by one or more hydroxyl groups.

Particularly preferred monounsaturated esters of (meth)acrylic acid having an alkyl radical substituted by one or more hydroxyl groups are 2-hydroxyethyl (meth)acrylate, 2-hydroxypropyl (meth)acrylate, 3-hydroxypropyl (meth)acrylate, 3-hydroxybutyl (meth)acrylate and 4-hydroxybutyl (meth)acrylate.

Possible further vinylic monounsaturated monomers are monomers having a non-olefinically unsaturated R' radical on the vinyl group.

The R' radical may be aliphatic or aromatic, preference being given to aromatic radicals.

The R' radical may be a hydrocarbyl radical, or contain heteroatoms. Examples of R' radicals containing heteroatoms are ethers, esters, amide, nitriles and heterocycles. Preferably, the R' radical is a hydrocarbyl radical. If R' is a hydrocarbyl radical, it may be substituted or unsubstituted by heteroatoms, preference being given to unsubstituted radicals. Preferably, the R' radical is an aromatic hydrocarbyl radical.

Particularly preferred further vinylic olefinically unsaturated monomers are vinylaromatic hydrocarbons, especially vinyltoluene, alpha-methylstyrene and especially styrene.

Further preferred monomers containing heteroatoms are olefinically unsaturated monomers such as acrylonitrile, methacrylonitrile, acrylamide, methacrylamide, N-dimethylacrylamide, vinyl acetate, vinyl propionate, vinyl chloride, N-vinylpyrrolidone, N-vinylcaprolactam, N-vinylformamide, N-vinylimidazole and N-vinyl-2-methylimidazoline.

Examples of suitable polyolefinically unsaturated monomers include esters of (meth)acrylic acid having an olefinically unsaturated R" radical, and allyl ethers of polyhydric alcohols.

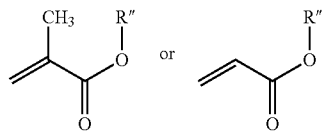

The R" radicals may, for example, be an allyl radical or a (meth)acrylic ester radical.

Preferred polyolefinically unsaturated monomers are ethylene glycol di(meth)acrylate, propylene 1,2-glycol di(meth)acrylate, propylene 2,2-glycol di(meth)acrylate, butane-1,4-diol di(meth)acrylate, neopentyl glycol di(meth)acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate and allyl (meth)acrylate.

Preferred polyolefinically unsaturated compounds are also acrylic and methacrylic esters of alcohols having more than two OH groups, for example trimethylolpropane tri (meth)acrylate or glyceryl tri(meth)acrylate, but also trimethylolpropane di(meth)acrylate monoallyl ether, trimethylolpropane (meth)acrylate diallyl ether, pentaerythrityl tri(meth)acrylate monoallyl ether, pentaerythrityl di(meth)acrylate diallyl ether, pentaerythrityl (meth)acrylate triallyl ether, triallylsucrose, and pentaallylsucrose.

Particular preference is given to using allyl methacrylate as the polyolefinically unsaturated monomer.

The mixture of the olefinically unsaturated monomers comprises at least one polyolefinically unsaturated monomer. Preferably, the mixture of the olefinically unsaturated monomers also comprises one or more monounsaturated esters of (meth)acrylic acid having an unsubstituted alkyl radical.

Preferably, the mixture of the olefinically unsaturated monomers contains 0.1 to 6.0 mol %, more preferably 0.1 to 2.0 mol %, most preferably 0.1 to 1.0 mol %, of polyolefinically unsaturated monomers. Preferably, the radical of the olefinically unsaturated monomers is monounsaturated.

Preferably, the mixture of the olefinically unsaturated monomers contains 0.1 to 6.0 mol %, more preferably 0.1 to 2.0 mol %, most preferably 0.1 to 2.0 mol %, of allyl methacrylate. More preferably, apart from allyl methacrylate, no further polyolefinically unsaturated monomers are present in the mixture.

Preferably, the mixture of olefinically unsaturated monomers contains less than 10.0% by weight, more preferably less than 5.0% by weight, of vinylaromatic hydrocarbons, based on the total amount of olefinically unsaturated monomers used in the polymerization. Most preferably, no vinylaromatic hydrocarbons are present in the mixture of the olefinically unsaturated monomers. It is especially preferable when less than 10.0% by weight, more preferably less than 5.0% by weight, based on the total amount of olefinically unsaturated monomers used in the polymerization, of olefinically unsaturated monomers having aromatic groups is used. More particularly, no olefinically unsaturated monomers having aromatic groups are present in the mixture of the olefinically unsaturated monomers.

It follows from this that the vinylaromatic hydrocarbons specified above as preferred, especially vinyltoluene, alpha-methylstyrene and styrene, are of course preferred only within the group of the monomers containing aromatic groups.

In spite of this, these monomers are preferably not used in the context of the invention. Should the use of such monomers nevertheless be an option in the individual case, preference is given to using the monomers containing aromatic groups designated as preferred.

In a preferred embodiment, the mixture of olefinically unsaturated monomers comprises:
  98.0 to 99.5% by weight of one or more monounsaturated esters of (meth)acrylic acid having unsubstituted alkyl radicals, where the alkyl radicals preferably have 1 to 10 carbon atoms, and
  0.5 to 2.0% by weight of one or more polyunsaturated esters of (meth)acrylic acid,
based in each case on the total amount of olefinically unsaturated monomers used in the polymerization.

Preference is given to adding at least one solvent to the mixture of olefinically unsaturated monomers, said solvent preferably being miscible in any ratio with water and in any ratio with the mixture of olefinically unsaturated monomers. Suitable organic solvents are N-methylpyrrolidone, N-ethylpyrrolidone and ether alcohols, such as methoxypropanol in particular, though it should be noted that pyrrolidone-based solvents may be dispensed with for environmental reasons alone. However, the amount of the organic solvent is selected such that the aqueous character of the dispersion ultimately obtained is conserved.

By virtue of the preparation process described, the copolymers in the aqueous dispersion of the invention especially have a core-shell structure which can be achieved through the preparation process described. This core-shell structure is characterized by a core containing at least one polyurethane, and a shell containing at least one polymer which has been obtained by polymerization of olefinically unsaturated monomers.

The core-shell structure described is achieved through the specific reaction conditions of the starved feed polymerization. Over the entire reaction time, there are never any great amounts of olefinically unsaturated monomers, which could penetrate into the polyurethane particles, in the presence of the initially charged polyurethane. The free radicals provided by the water-soluble initiator, which are always present during the addition of monomer in the aqueous phase, form oligomers immediately on addition, which can no longer penetrate into the polyurethane. These then polymerize on the surface of the polyurethane.

In a preferred embodiment, the weight ratio of core to shell is 80:20 to 20:80, more preferably 60:40 to 40:60. What is meant here is the ratio of the amounts of components used for production of core (step (i), polyurethane) and shell (step (ii), mixture of olefinically unsaturated monomers).

Preferably, the copolymers (CP) in the aqueous dispersion have a particle size (z average) of 60 to 130 nm, more preferably of 70 to 115 nm, measured by means of photon correlation spectroscopy with a Malvern Nano S90 (from Malvern Instruments) at 25±1° C. The instrument, equipped with a 4 mW He—Ne laser at a wavelength of 633 nm, covers a size range from 1 to 3000 nm.

The copolymers (CP) may preferably be crosslinked. The gel content of the aqueous dispersion of the invention is preferably 40 to 97% by weight, more preferably 75 to 90% by weight, based in each case on the solids of the dispersion.

The gel content can be determined gravimetrically by freeze-drying the dispersion, determining the total mass of the freeze-dried polymer (corresponds to the solids of the dispersion in the context of determining the gel content), and then extracting the polymer in an excess of tetrahydrofuran (ratio of tetrahydrofuran to freeze-dried polymer=300:1) at 25° C. for 24 hours. The insoluble fraction is removed and dried in an air circulation oven at 50° C. for four hours. Thereafter, the dried, insoluble fraction is weighed and the quotient is formed with the total mass of the freeze-dried polymer. The value obtained corresponds to the gel content.

The weight-average molar mass of the copolymers (CP) is preferably $3*10^7$ g/mol to $8.5*10^9$ g/mol, it being possible to determine the weight-average molar mass by small-angle laser light scattering.

The acid number of the copolymers (CP) is preferably 0 to 220 mg KOH/g solid resin, preferably 0 to 40 mg KOH/g solid resin, more preferably 0 to 25 mg KOH/g solid resin. The OH number is preferably less than 70 mg KOH/g solid resin, preferably less than 20 mg KOH/g solid resin. The terms "solid resin" and "solids" in relation to a polymer or a dispersion of a polymer are equivalent. Thus, they refer more particularly to the solids or solid content of a polymer dispersion as elucidated below.

The acid number can be determined on the basis of DIN EN ISO 2114 in homogeneous solution of THF/water (9 parts by volume of THF and 1 part by volume of distilled water) with ethanolic potassium hydroxide solution.

The OH number can be determined on the basis of R.-P. Krüger, R. Gnauck and R. Algeier, Plaste and Kautschuk, 20, 274 (1982), by means of acetic anhydride in the presence of 4-dimethylaminopyridine as a catalyst in a tetrahydrofuran (THF)/dimethylformamide (DMF) solution at room temperature, by fully hydrolyzing the excess of acetic anhydride remaining after acetylation and conducting a potentiometric back-titration of the acetic anhydride with alcoholic potassium hydroxide solution.

The aqueous dispersions of the at least one copolymer (CP) preferably have a solids content of 15 to 45% by weight, especially preferably 25 to 35% by weight. Solids contents of this kind can be established without any problem through the use of appropriate amounts of organic solvents and especially water in the course of preparation of the copolymers and/or by appropriate dilution after the preparation.

The proportion of the copolymers (CP) is preferably in the range from 0.5 to 15.0% by weight, more preferably 0.75 to 12.5% by weight, especially preferably 1.0 to 10.0% by weight, especially 1.5 to 7.5% by weight, based in each case on the total weight of the aqueous basecoat material (b.2.1).

The basecoat material (b.2.1) for use in accordance with the invention additionally comprises at least one specific reaction product (R), preferably exactly one reaction product (R).

The reaction products are linear. Linear reaction products can in principle be obtained by the conversion of difunctional reactants, in which case the linkage of the reactants via reaction of the functional groups gives rise to a linear, i.e. catenated, structure. Thus, for example, if the reaction product is a polymer, the backbone has a linear character. If the reaction product is, for example, a polyester, the reactants used may be diols and dicarboxylic acids, in which case the sequence of ester bonds in the reaction product has linear character. Preferably, in the preparation of the reaction product (R), principally difunctional reactants are thus used. Other reactants, such as monofunctional compounds in particular, are accordingly used preferably only in minor amounts, if at all. Especially at least 80 mol %, preferably at least 90 mol % and most preferably exclusively difunctional reactants are used. If further reactants are used, these are preferably selected exclusively from the group of the monofunctional reactants. It is preferable, however, that exclusively difunctional reactants are used.

Useful functional groups for the reactants include the functional groups known to the person skilled in the art in this context. The combinations of reactants having appropriate functional groups which can be linked to one another and can thus serve for preparation of the reaction product are also known in principle. The same applies to the reaction conditions necessary for linkage. Preferred functional groups for the reactants are hydroxyl, carboxyl, imino, carbamate, allophanate, thio, anhydride, epoxy, isocyanate, methylol, methylol ether, siloxane and/or amino groups, especially preferably hydroxyl and carboxyl groups. Preferred combinations of functional groups which can be linked to one another are hydroxyl and carboxyl groups, isocyanate and hydroxyl groups, isocyanate and amino groups, epoxy and carboxyl groups and/or epoxy and amino groups; in choosing the functional groups, it should be ensured that the hydroxyl functionality and acid number described below are obtained in the reaction product. The linkage then gives rise to the linkage points known to those skilled in the art, for example ester groups, urethane groups and/or urea groups. Very particular preference is given to a combination of hydroxyl and carboxyl groups. In this embodiment, at least one reactant thus has hydroxyl groups, and at least one further reactant carboxyl groups. Preference is given to using a combination of dihydroxy-functional and dicarboxy-functional reactants. Conducting the reaction of these reactants in a manner known per se forms reaction products containing ester bonds.

The reaction product is hydroxy-functional. It is preferable that the reactants are converted in such a way that linear molecules which form have two terminal hydroxyl groups. This means that one hydroxyl group is present at each of the two ends of these molecules.

The reaction product has an acid number of less than 20, preferably less than 15, especially preferably less than 10 and most preferably less than 5 mg KOH/g. Thus, it preferably has only a very small amount of carboxylic acid groups. Unless explicitly stated otherwise, the acid number in the context of the present invention is determined to DIN 53402. Thus, it relates to the reaction product per se, i.e. to the solids content (for determination of the solids content see below).

If reference is made in the context of the present invention to an official standard without reference to the official period of validity, this of course means the version of the standard current at the filing date or, if no current version exists at this date, the last current version.

The hydroxyl functionality described, just like the low acid number, can be obtained, for example, in a manner known per se by the use of appropriate ratios of reactants having appropriate functional groups. In the preferred case that dihydroxy-functional and dicarboxy-functional reactants are used in the preparation, an appropriate excess of the dihydroxy-functional component is thus used. In this context, the following should additionally be explained. For purely statistical reasons alone, a real reaction of course does not just give molecules having, for example, the desired (di)hydroxyl functionality. However, the choice of appropriate conditions, for example an excess of dihydroxy-functional reactants, and conducting the reaction until the desired acid number is obtained, guarantee that the conversion products or molecules which make up the reaction product are hydroxy-functional at least on average. The person skilled in the art knows how to choose appropriate conditions.

In the preparation of the reaction product, at least one compound (v) used or converted as a reactant has two functional groups (v.a) and an aliphatic or araliphatic hydrocarbyl radical (v.b) which is arranged between the two functional groups and has 12 to 70, preferably 22 to 55 and more preferably 30 to 40 carbon atoms. The compounds (v) thus consist of two functional groups and the hydrocarbyl radical. Useful functional groups of course include the above-described functional groups, especially hydroxyl and carboxyl groups. Aliphatic hydrocarbyl radicals are known to be acyclic or cyclic, saturated or unsaturated, nonaromatic hydrocarbyl radicals. Araliphatic hydrocarbyl radicals are those which contain both aliphatic and aromatic structural units.

The number-average molecular weight of the reaction products may vary widely and is, for example, from 600 to 40 000 g/mol, especially from 800 to 10 000 g/mol, most preferably from 1200 to 5000 g/mol. Unless explicitly indicated otherwise, the number-average molecular weight in the context of the present invention is determined by means of vapor pressure osmosis. Measurement was effected using a vapor pressure osmometer (model 10.00 from Knauer) on concentration series of the component under investigation in toluene at 50° C., with benzophenone as calibration substance for determination of the experimental calibration constant of the instrument employed (in accordance with E. Schröder, G. Müller, K.-F. Arndt, "Leitfaden der Polymercharakterisierung", Akademie-Verlag, Berlin, pp. 47-54, 1982, in which benzil was used as calibration substance).

Preferred compounds (v) are dimer fatty acids, or are present in dimer fatty acids. In the preparation of the reaction products (R), dimer fatty acids are thus used preferably, but not exclusively, as compound (v). Dimer fatty acids (also long known as dimerized fatty acids or dimer acids) are generally, and especially in the context of the present invention, mixtures prepared by oligomerization of unsaturated fatty acids. They are preparable, for example, by catalytic dimerization of unsaturated plant fatty acids, the starting materials used more particularly being unsaturated $C_{12}$ to $C_{22}$ fatty acids. The bonds are formed principally by the Diels-Alder mechanism, and the result, depending on the number and position of the double bonds in the fatty acids used to prepare the dimer fatty acids, is mixtures of principally dimeric products having cycloaliphatic, linear aliphatic, branched aliphatic, and also $C_6$ aromatic hydrocarbon groups between the carboxyl groups. Depending on mechanism and/or any subsequent hydrogenation, the aliphatic radicals may be saturated or unsaturated, and the fraction of aromatic groups may also vary. The radicals between the carboxylic acid groups then contain, for example, 24 to 44 carbon atoms. For the preparation, fatty acids having 18 carbon atoms are used with preference, and so the dimeric product has 36 carbon atoms. The radicals which join the carboxyl groups of the dimer fatty acids preferably have no unsaturated bonds and no aromatic hydrocarbon radicals.

In the context of the present invention, $C_{18}$ fatty acids are thus used with preference in the preparation. Particular preference is given to the use of linolenic, linoleic and/or oleic acid.

Depending on the reaction regime, the above-identified oligomerization gives rise to mixtures comprising primarily dimeric molecules, but also trimeric molecules and monomeric molecules and other by-products. Purification is typically effected by distillation. Commercial dimer fatty acids generally contain at least 80% by weight of dimeric molecules, up to 19% by weight of trimeric molecules, and not more than 1% by weight of monomeric molecules and of other by-products.

Preference is given to using dimer fatty acids which consist to an extent of at least 90% by weight, preferably to an extent of at least 95% by weight, most preferably at least to an extent of 98% by weight, of dimeric fatty acid molecules.

In the context of the present invention, preference is given to using dimer fatty acids which consist of at least 90% by weight of dimeric molecules, less than 5% by weight of trimeric molecules, and less than 5% by weight of monomeric molecules and other by-products. Particular preference is given to the use of dimer fatty acids which consist of 95 to 98% by weight of dimeric molecules, less than 5% by weight of trimeric molecules, and less than 1% by weight of monomeric molecules and of other by-products. Likewise used with particular preference are dimer fatty acids consisting of at least 98% by weight of dimeric molecules, less than 1.5% by weight of trimeric molecules, and less than 0.5% by weight of monomeric molecules and other by-products. The fractions of monomeric, dimeric, and trimeric molecules and of other by-products in the dimer fatty acids can be determined, for example, by means of gas chromatography (GC). In that case, prior to the GC analysis, the dimer fatty acids are converted to the corresponding methyl esters via the boron trifluoride method (cf. DIN EN ISO 5509) and then analyzed by means of GC.

A fundamental identifier of "dimer fatty acids" in the context of the present invention, therefore, is that their preparation involves the oligomerization of unsaturated fatty acids. This oligomerization gives rise principally, in other words to an extent preferably of at least 80% by weight, more preferably to an extent of at least 90% by weight, even more preferably to an extent of at least 95% by weight and more particularly to an extent of at least 98% by weight, to dimeric products. The fact that the oligomerization thus gives rise to predominantly dimeric products containing exactly two fatty acid molecules justifies this designation, which is commonplace in any case. An alternative expression for the relevant term "dimer fatty acids", therefore, is "mixture comprising dimerized fatty acids". The use of dimeric fatty acids thus automatically implements the use of difunctional compounds (v). This also justifies the statement, chosen in the context of the present invention, that dimer fatty acids are preferably used as compound (v). This is because compounds (v) are apparently the main constituent of the mixtures referred to as dimer fatty acids. Thus, if dimer fatty acids are used as compounds (v), this means that these compounds (v) are used in the form of corresponding mixtures with above-described monomeric and/or trimeric molecules and/or other by-products.

The dimer fatty acids to be used can be obtained as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1061, and Empol 1062 from BASF, and Unidyme 10 and Unidyme TI from Arizona Chemical.

Further preferred compounds (v) are dimer diols, or are present in dimer diols. Dimer diols have long been known and are also referred to in the scientific literature as dimeric fatty alcohols. These are mixtures which are prepared, for example, by oligomerization of unsaturated fatty acids or esters thereof and subsequent hydrogenation of the acid or ester groups, or by oligomerization of unsaturated fatty alcohols. The starting materials used may be unsaturated $C_{12}$ to $C_{22}$ fatty acids or esters thereof, or unsaturated $C_{12}$ to $C_{22}$ fatty alcohols. The hydrocarbyl radicals which connect the hydroxyl groups in the dimer diols are defined in the same way as the hydrocarbyl radicals which divide the carboxyl groups of the dimer fatty acids.

For example, DE-11 98 348 describes the preparation thereof by dimerization of unsaturated fatty alcohols with basic alkaline earth metal compounds at more than 280° C. They can also be prepared by hydrogenation of dimer fatty acids and/or esters thereof as described above, according to German Auslegeschrift DE-B-17 68 313. Under the conditions described therein, not only are the carboxyl groups of the fatty acids hydrogenated to hydroxyl groups, but any double bonds still present in the dimer fatty acids or esters thereof are also partly or fully hydrogenated. It is also possible to conduct the hydrogenation in such a way that the double bonds are fully conserved during the hydrogenation. In this case, unsaturated dimer diols are obtained. Preferably, the hydrogenation is conducted in such a way that the double bonds are very substantially hydrogenated.

Another way of preparing dimer diols involves dimerizing unsaturated alcohols in the presence of siliceous earth/alumina catalysts and basic alkali metal compounds according to international application WO 91/13918.

Irrespective of the processes described for preparation of the dimer diols, preference is given to using those dimer diols which have been prepared from $C_{18}$ fatty acids or esters thereof, or $C_{18}$ fatty alcohols. In this way, predominantly dimer diols having 36 carbon atoms are formed.

Dimer diols which have been prepared by the abovementioned industrial processes always have varying amounts of trimer triols and monofunctional alcohols. In general, the proportion of dimeric molecules is more than 70% by weight, and the remainder is trimeric molecules and monomeric molecules. In the context of the invention, it is possible to use either these dimer diols or purer dimer diols having more than 90% by weight of dimeric molecules. Particular preference is given to dimer diols having more than 90 to 99% by weight of dimeric molecules, and preference is given in turn among these to those dimer diols whose double bonds and/or aromatic radicals have been at least partly or fully hydrogenated. An alternative expression for the relevant term "dimer diols" is thus "mixture comprising dimers preparable by dimerization of fatty alcohols". The use of dimer diols thus automatically implements the use of difunctional compounds (v). This also justifies the statement, chosen in the context of the present invention, that dimer diols are used as compound (v). This is because compounds (v) are apparently the main constituent of the mixtures referred to as dimer diols. Thus, if dimer diols are used as compounds (v), this means that these compounds (v) are used in the form of corresponding mixtures with above-described monomeric and/or trimeric molecules and/or other by-products.

Preferably, the mean hydroxyl functionality of the dimer diols should be 1.8 to 2.2.

In the context of the present invention, particular preference is therefore given to using those dimer diols which can be prepared by hydrogenation from the above-described dimer fatty acids. Very particular preference is given to those dimer diols which consist of ≥90% by weight of dimeric molecules, ≤5% by weight of trimeric molecules, and ≤5% by weight of monomeric molecules and of other by-products, and/or have a hydroxyl functionality of 1.8 to 2.2. Particular preference is given to the use of those diols which can be prepared by hydrogenation from dimer fatty acids which consist of 95 to 98% by weight of dimeric molecules, less than 5% by weight of trimeric molecules, and less than 1% by weight of monomeric molecules and of other by-products. Particular preference is likewise given to the use of those diols which can be prepared by hydrogenation from dimer fatty acids which consist of ≥98% by weight of dimeric molecules, ≤1.5% by weight of trimeric molecules, and ≤0.5% by weight of monomeric molecules and of other by-products.

Dimer fatty acids which can be used to prepare the dimer diols contain, as already described above, according to the reaction regime, both aliphatic and possibly aromatic molecular fragments. The aliphatic molecular fragments can be divided further into linear and cyclic fragments, which in turn may be saturated or unsaturated. Through hydrogenation, the aromatic and the unsaturated aliphatic molecular fragments can be converted to corresponding saturated aliphatic molecular fragments. The dimer diols usable as component (v) may accordingly be saturated or unsaturated.

The dimer diols are preferably aliphatic, especially aliphatic and saturated.

In the context of the present invention, preference is given to using those dimer diols which can be prepared by hydrogenation of the carboxylic acid groups of preferably saturated aliphatic dimer fatty acids.

Particular preference is given to the use of those diols which can be prepared by hydrogenation from dimer fatty acids which consist of 98% by weight of dimeric molecules, ≤1.5% by weight of trimeric molecules, and 0.5% by weight of monomeric molecules and of other by-products.

More preferably, the dimer diols have a hydroxyl number of 170 to 215 mg KOH/g, even more preferably of 195 to 212 mg KOH/g and especially 200 to 210 mg KOH/g, determined by means of DIN ISO 4629. More preferably, the dimer diols have a viscosity of 1500 to 5000 mPas, even more preferably 1800 to 2800 mPas (25° C., Brookfield, ISO 2555).

Dimer diols for use with very particular preference include the commercial products Pripol® 2030 and especially Priopol® 2033 from Uniqema, or Sovermol® 908 from BASF.

Preferred reaction products (R) are preparable by reaction of dimer fatty acids with aliphatic, araliphatic or aromatic dihydroxy-functional compounds. Aliphatic compounds are nonaromatic organic compounds. They may be linear, cyclic or branched. Possible examples of compounds are those which consist of two hydroxyl groups and an aliphatic hydrocarbyl radical. Also possible are compounds which, as well as the oxygen atoms present in the two hydroxyl groups, contain further heteroatoms such as oxygen or nitrogen, especially oxygen, for example in the form of linking ether and/or ester bonds. Araliphatic compounds are those which contain both aliphatic and aromatic structural units. It is preferable, however, that the reaction products (R) are prepared by reaction of dimer fatty acids with aliphatic dihydroxy-functional compounds.

The aliphatic, araliphatic or aromatic dihydroxy-functional compounds preferably have a number-average molecular weight of 120 to 6000 g/mol, especially preferably of 200 to 4500 g/mol.

The statement of a number-average molecular weight thus implies that preferred dihydroxy-functional compounds are mixtures of various large dihydroxy-functional molecules. The dihydroxy-functional compounds are preferably polyether diols, polyester diols or dimer diols.

It is preferable in the context of the present invention that the dimer fatty acids and the aliphatic, araliphatic and/or aromatic, preferably aliphatic, dihydroxy-functional compounds are reacted with one another in a molar ratio of 0.7/2.3 to 1.6/1.7, preferably of 0.8/2.2 to 1.6/1.8 and most preferably of 0.9/2.1 to 1.5/1.8. As a result of the excess of hydroxyl groups, hydroxy-functional reaction products additionally having a low acid number are thus obtained. Through the level of the excess, it is possible to control the molecular weight of the reaction product. If only a small excess of the hydroxy-functional reactant is used, the result is correspondingly longer-chain products, since only in that case is a substantial conversion of the acid groups present guaranteed. In the case of a higher excess of the hydroxy-functional reactant, the result is correspondingly shorter-chain reaction products. The number-average molecular weight of the reaction products is of course also influenced by the molecular weight of the reactants, for example the preferably aliphatic dihydroxy-functional compounds. The number-average molecular weight of the preferred reaction products may vary widely and is, for example, from 600 to 40 000 g/mol, especially from 800 to 10 000 g/mol, most preferably from 1200 to 5000 g/mol.

The preferred reaction products can thus also be described as linear block-type compounds A-(B-A)$_n$. In that case, at least one type of blocks is based on a compound (v). Preferably, the B blocks are based on dimer fatty acids, i.e. compounds (v). The A blocks are preferably based on aliphatic dihydroxy-functional compounds, especially preferably on aliphatic polyether diols, polyester diols or dimer diols. In the latter case, the respective reaction product is thus based exclusively on compounds (v) joined to one another.

Very particularly preferred reaction products are preparable by reaction of dimer fatty acids with at least one aliphatic dihydroxy-functional compound of the general structural formula (I):

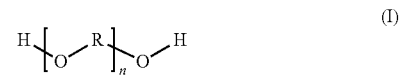

where R is a $C_3$ to $C_6$ alkylene radical and n is correspondingly selected such that the compound of the formula (I) has a number-average molecular weight of 120 to 6000 g/mol, the dimer fatty acids and the compounds of the formula (I) are used in a molar ratio of 0.7/2.3 to 1.6/1.7, and the resulting reaction product has a number-average molecular weight of 600 to 40 000 g/mol and an acid number of less than 10 mg KOH/g.

In a very particularly preferred embodiment, n is thus selected here such that the compound of the formula (I) has a number-average molecular weight of 450 to 2200 g/mol, especially 800 to 1200 g/mol. R is preferably a $C_3$ or $C_4$ alkylene radical. It is more preferably an isopropylene radical or a tetramethylene radical. Most preferably, the compound of the formula (I) is polypropylene glycol or polytetrahydrofuran. The dimer fatty acids and the compounds of the formula (I) are used here preferably in a molar ratio of 0.7/2.3 to 1.3/1.7. In this embodiment, the resulting reaction product has a number-average molecular weight of 1500 to 5000 g/mol, preferably 2000 to 4500 g/mol and most preferably 2500 to 4000 g/mol.

Likewise very particularly preferred reaction products are preparable by reaction of dimer fatty acids with at least one dihydroxy-functional compound of the general structural formula (II):

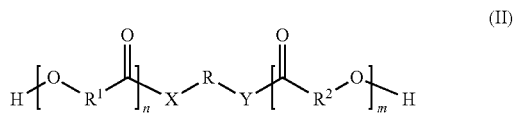

where
R is a divalent organic radical comprising 2 to 10 carbon atoms,
$R^1$ and $R^2$ are each independently straight-chain or branched alkylene radicals having 2 to 10 carbon atoms,
X and Y are each independently O, S or $NR^3$ in which $R^3$ is hydrogen or an alkyl radical having 1 to 6 carbon atoms, and
m and n are correspondingly selected such that the compound of the formula (II) has a number-average molecular weight of 450 to 2200 g/mol,
in which components (a) and (b) are used in a molar ratio of 0.7/2.3 to 1.6/1.7 and the resulting reaction product has a number-average molecular weight of 1200 to 5000 g/mol and an acid number of less than 10 mg KOH/g, In structural formula (II), R is a divalent organic radical comprising 2 to 10 carbon atoms and preferably 2 to 6 carbon atoms. The R radical may, for example, be aliphatic, aromatic or araliphatic. The R radical, as well as carbon atoms and hydrogen atoms, may also contain heteroatoms, for example 0 or N. The radical may be saturated or unsaturated. R is preferably an aliphatic radical having 2 to 10 carbon atoms, more preferably an aliphatic radical having 2 to 6 carbon atoms and most preferably an aliphatic radical having 2 to 4 carbon atoms. For example, the R radical is $C_2H_4$, $C_3H_6$, $C_4H_8$ or $C_2H_4$—O—$C_2H_4$.

$R^1$ and $R^2$ are each independently straight-chain or branched alkylene radicals having 2 to 10 carbon atoms, preferably 2 to 6 carbon atoms and more preferably 3 to 5 carbon atoms. These radicals preferably contain only carbon and hydrogen.

In the compounds of the structural formula (II), all n $R^1$ radicals and all m $R^2$ radicals may be identical. However, it is also possible that different kinds of $R^1$ and $R^2$ radicals are present. Preferably, all $R^1$ and $R^2$ radicals are identical. With very particular preference, $R^1$ and $R^2$ are a $C_4$ or $C_5$ alkylene radical, especially a tetramethylene or pentamethylene radical. In a very particularly preferred embodiment of the present invention, both radicals, $R^1$ and $R^2$, are pentamethylene radicals.

X and Y are each independently O, S or $NR^3$ in which $R^3$ is hydrogen or an alkyl radical having 1 to 6 carbon atoms. Preferably, X and Y are each independently O or $NR^3$; more preferably, they are each independently O and NH; most preferably, X and Y are O.

The indices m and n are accordingly selected such that the compounds of the structural formula (II) have a number-average molecular weight of 450 to 2200 g/mol, preferably 500 to 1400 g/mol, more preferably 500 to 1200 g/mol.

The polyester polyols of the general structural formula (I) can be prepared by a first route, where compounds HX—R—YH act as starter compounds and the hydroxy-terminated polyester chains are polymerized onto the starter compound by ring-opening polymerization of lactones of the hydroxycarboxylic acids HO—$R^1$—COOH and HO—$R^2$—COOH. By a second route, it is of course also possible first to prepare alpha-hydroxy-gamma-carboxy-terminated polyesters, for example by ring-opening polymerization of lactones of the hydroxycarboxylic acids HO—$R^1$—COOH and HO—$R^2$—COOH, or by polycondensation of the hydroxycarboxylic acids HO—$R^1$—COOH and HO—$R^2$—COOH. The alpha-hydroxy-gamma-carboxy-terminated polyesters can then be reacted in turn with compounds HX—R—YH, by means of a condensation reaction, to give the polyester diols for use in accordance with the invention.

Corresponding processes are described, for example, in German Offenlegungsschrift 2234265 "Hydroxylendständige Polylactone" [Hydroxyl-terminal polylactones] from the applicant Stamicarbon N.V.

The dimer fatty acids and the compounds of the formula (II) are used here preferably in a molar ratio of 0.7/2.3 to 1.3/1.7. In this embodiment, the resulting reaction product preferably has a number-average molecular weight of 1200 to 5000 g/mol, preferably 1200 to 4500 g/mol and most preferably 1200 to 4000 g/mol.

Likewise very particularly preferred reaction products (R) are preparable by reaction of dimer fatty acids with dimer diols, in which the dimer fatty acids and dimer diols are used in a molar ratio of 0.7/2.3 to 1.6/1.7 and the resulting reaction product has a number-average molecular weight of 1200 to 5000 g/mol and an acid number of less than 10 mg KOH/g.

Preferred dimer diols have already been described above. It is preferable here that the dimer fatty acids and dimer diols are used in a molar ratio of 0.7/2.3 to 1.3/1.7. The resulting reaction product here preferably has a number-average molecular weight of 1200 to 5000 g/mol, preferably 1300 to 4500 g/mol, and very preferably 1500 to 4000 g/mol.

It follows from the above statements that the reaction products (R) are preparable by the exclusive use of compounds (v). For example, it is possible to prepare the reaction products by the use of the above-described preferred dimer fatty acids and dimer diols. Both compound classes are compounds (v), or both compound classes are mixtures comprising difunctional compounds (v). However, it is equally possible to prepare reaction products (R) by the reaction of compounds (v), preferably dimer fatty acids, with other organic compounds, especially those of the structural formulae (I) and (II).

In the context of the present invention, it is preferable that 25 to 100 mol % of at least one compound (v) are used in the preparation of the reaction products. If exclusively compounds (v) are used, it is evident that at least two compounds (v) are used.

The proportion of the reaction products (R) is preferably in the range from 0.1 to 15% by weight, preferably 0.5 to 12% by weight, more preferably 0.75 to 8% by weight, based in each case on the total weight of the aqueous basecoat material (b.2.1).

If the content of the reaction products (R) is below 0.1% by weight, it may be the case that no further improvement is achieved in the stability to pinholes. If the content is more than 15% by weight, disadvantages may occur under some circumstances, for example incompatibility of said reaction product in the aqueous coating composition. Such incompatibility may be manifested, for example, in uneven levelling and also in floating or settling.

The reaction product of the invention is generally sparingly soluble in aqueous systems. It is therefore preferably used directly in the production of the aqueous coating composition, and is not added to the otherwise finished coating composition only on completion of production.

The basecoat material (b.2.1) for use in accordance with the invention additionally comprises at least one specific polyurethane resin (X), preferably exactly one such polyurethane resin.

Polyurethane resins are known in principle; the preparation thereof and the starting compounds usable in the preparation, especially polyisocyanates and polyols, which are also used for preparation of the polyurethane resin (X), are described, for example, in WO 92/15405 A1, page 4 line 28 to page 10 line 32 and page 14 line 13 to page 15 line 28, or else in DE 199 48 004 A1, page 4 line 19 to page 9 line 62 and/or else further up in the description of the polyurethane used in step (i) of the preparation of the copolymer (CP).

It is preferable that the at least one polyurethane resin (X) is carboxy-functional. It preferably has an acid number of 5 to 100 mg KOH/g, more preferably 7 to 50 mg KOH/g, especially preferably 15 to 35 mg KOH/g. Especially the carboxylic acid groups present can hydrophilically stabilize the polyurethane resin (X), or the polyurethane resin (X) has elevated dispersibility in aqueous media, such that it can be transferred into aqueous dispersions as described below without adverse effects and hence can also be integrated into the aqueous coating composition of the invention. As is well known, such carboxylic acid groups, according to the pH or according to use of neutralizing agents which are known in this context, may also be present as ionic carboxylate groups. Carboxylic acid groups are thus among the functional groups which can be converted to ionic groups (potentially ionic groups). Neutralization of the carboxyl groups is accomplished using, for example, ammonia, amines and/or amino alcohols, such as di- and triethylamine, dimethylaminoethanol, diisopropanolamine, morpholines and/or N-alkylmorpholines.

The carboxylic acid groups are used in the preparation of the polyurethane resin (X) through the use of corresponding starting compounds for the preparation of these polyurethane resins, namely through carboxyl-containing compounds (x.1) containing at least one carboxylic acid group and at least one functional group reactive toward isocyanate groups, preferably hydroxyl groups. In this way, it is possible to incorporate the compound (x.1) into the polyurethane base skeleton and, at the same time, to introduce carboxylic acid groups into the polyurethane resin (X). Preferably, the compound (x.1) contains at least one carboxylic acid group and at least two hydroxyl groups, most preferably one carboxylic acid group and two hydroxyl groups.

Useful compounds (x.1) include, if they contain carboxyl groups, for example, polyether polyols and/or polyester polyols, especially polyester polyols. Polyester polyols of this kind are described, for example, in DE 39 03 804 A1 and can be prepared in the manner known to those skilled in the art. For example, said polyester polyols (x.1) can be prepared via a standard polyester synthesis in organic solvents and in the presence of standard catalysts such as dibutyltin laurate, it being possible to use not only difunctional monomeric starting compounds typically used, i.e. diols and dicarboxylic acids and corresponding anhydrides, but also trifunctional starting compounds such as triols, tricarboxylic acids and corresponding anhydrides, for example trimellitic anhydride, and dihydroxycarboxylic acids. In this way, it is possible through the introduction of possible branching sites to prepare polyesters which may contain both hydroxyl groups and carboxylic acid groups.

Since a polyester, being a polymeric system, is always a mixture of molecules of different size, it is apparent that the features specified above, for example with regard to the existence of carboxylic acid groups or hydroxyl groups in polyesters (x.1), are regarded as statistical mean values. Preferably, such compounds (x.1) have number-average molecular weights of 300 to 3000 g/mol. The preparation of such compounds (x.1) is possible through simple adjustment of, for example, reaction conditions and ratios used for the starting materials described.

However, compounds (x.1) used are preferably low molecular weight compounds having at least one carboxylic acid group and at least one functional group reactive toward isocyanate groups, preferably hydroxyl groups. In the context of the present invention, the expression "low molecular weight compounds", as opposed to higher molecular weight compounds, especially polymers, should be understood to mean those to which a discrete molecular weight can be assigned, as preferably monomeric compounds. A low molecular weight compound is thus, more particularly, not a polymer, since the latter are always a mixture of molecules and have to be described using mean molecular weights. Preferably, the term "low molecular weight compound" is understood to mean that corresponding compounds have a molecular weight of less than 300 g/mol. Preference is given to the range from 100 to 200 g/mol.

Compounds (x.1) preferred in this context are, for example, monocarboxylic acids containing two hydroxyl groups, for example dihydroxypropionic acid, dihydroxysuccinic acid and dihydroxybenzoic acid. Very particularly preferred compounds (x.1) are alpha,alpha-dimethylolalkanoic acids such as 2,2-dimethylolacetic acid, 2,2-dimethylolpropionic acid, 2,2-dimethylolbutyric acid and/or 2,2-dimethylolpentanoic acid, especially 2,2-dimethylolpropionic acid.

The polyurethane resins (X) can be prepared by known and established methods in bulk or solution, especially preferably by conversion of the starting compounds used in typical organic solvents, such as methyl ethyl ketone, at elevated temperatures and optionally with use of catalysts typical for polyurethane preparation. Such catalysts are known to those skilled in the art, one example being dibutyltin laurate.

It is preferable, however, that the preparation is effected at temperatures of not higher than 120° C., preferably of 30 to 100° C., especially of 40 to 90° C. This has the advantage that the carboxylic acid groups present in the compounds (x.1) react only to a minor degree, if at all, with any polyols present to form ester bonds, such that the carboxylic acid groups remain in their free form and hence can form the basis of the carboxyl functionality of the polyurethane resin (X). However, the temperatures mentioned are in any case sufficient to permit an effective reaction of isocyanates with alcohols and amines. It is likewise preferable in this context when no catalysts usable for polyurethane preparation, for example dibutyltin laurate, are used. This is because catalysts usable for polyurethane preparation are known to generally catalyze ester formation too. Preferably, the polyurethane resin, after the preparation, which preferably proceeds in organic solvents, is transferred to an aqueous dispersion. This is preferably done by adding neutralizing agents already mentioned above and adding water, and distilling off the at least one organic solvent. The addition of water is conducted in such a way that the dispersions of the polyurethane resin (X) have a solids content (nonvolatile content) of preferably 10 to 60% by weight, especially 15 to 45% by weight. The polyurethane resin (X) is preferably used in the coating composition of the invention in the form of such dispersions.

Preferably, the preparation of the polyurethane resins (X) proceeds in such a way that difunctional starting compounds, preferably diols and diisocyanates, and a component (x.1) are first reacted with one another to give a prepolymer still containing isocyanate groups, and the latter is then reacted with a starting compound having at least three hydroxyl groups, preferably exactly three hydroxyl groups. Preference is given to monomeric triols, especially trimethylolethane, trimethylolpropane and glycerol. This is then followed, as described, by neutralization with preferably tertiary amines and dispersion of the polyurethane resin (X) in water.

Preferably, in the first step, at least one polyester diol, at least one monomeric diol, at least one monomeric compound (x.1) as described above and at least one polyisocyanate are reacted and then, in the second step, the product is reacted with at least one monomeric triol as described above.

In the context of the present invention, it is preferable that at least 70% by weight of the starting compounds used for preparation of the polyurethane resin (X) are those which contain, as functional polymerizable groups (i.e. those suitable for formation of polymeric base skeletons), exclusively isocyanate groups, hydroxyl groups and carboxylic acid groups, and also anhydride groups derived therefrom. In this way, and through the suitable selection of the reaction conditions known per se for preparation of polyurethane resins, it is possible to prepare resins in which the starting compounds are linked principally via urethane bonds (through reaction of isocyanate groups and hydroxyl groups) and the carboxylic acid groups remain in unconverted form in the polymer for achievement of the acid number which is essential to the invention. The polyurethane resin (B) is thus a resin in which, through the appropriate selection of starting compounds, the linkage of these starting compounds has been achieved principally through urethane bonds. Further functional polymerizable groups are known to those skilled in the art. Ultimately, useful groups in this context are all the possible groups for preparation of polycondensation and polyaddition resins, and also olefinically unsaturated groups as encountered in vinyl-containing, allyl-containing and acryloyl- and methacryloyl-containing starting compounds for preparation of resins preparable by free-radical polymerization, such as (meth)acrylate (co)polymers. Examples include thio, N-methylolamino-N-alkoxymethylamino, imino, carbamate, allophanate, epoxy, methylol, methylol ether, siloxane, carbonate, amino, and beta-hydroxyalkylamide groups, and also vinyl, allyl, acryloyl and methacryloyl groups. It is preferable that at least 80% by weight, preferably at least 90% by weight and most preferably 100% by weight of the starting compounds used for preparation of the polyurethane resins (X) contain exclusively isocyanate groups, hydroxyl groups and carboxylic acid groups as polymerizable groups. It is thus especially preferable that the polyurethane resin (X) is not a copolymer.

The number-average molecular weight of the polyurethane resins (X) may vary widely. It is preferably in the range from 1000 to 50 000 g/mol, especially 2000 to 30 000 g/mol.

The proportion of the polyurethane resins (X) is preferably in the range from 0.1 to 15% by weight, preferably 0.5 to 10% by weight, more preferably 0.75 to 8% by weight, based in each case on the total weight of the aqueous basecoat material (b.2.1).

The basecoat material (b.2.1) preferably comprise pigments, i.e. color pigments and/or effect pigments. Such color pigments and effect pigments are known to those skilled in the art and are described, for example, in Römpp-Lexikon Lacke and Druckfarben, Georg Thieme Verlag, Stuttgart, N.Y., 1998, pages 176 and 451. The terms "coloring pigment" and "color pigment" are interchangeable, just like the terms "visual effect pigment" and "effect pigment".

Preferred effect pigments are, for example, platelet-shaped metal effect pigments such as lamellar aluminum pigments, gold bronzes, oxidized bronzes and/or iron oxide-aluminum pigments, pearlescent pigments such as pearl essence, basic lead carbonate, bismuth oxide chloride and/or metal oxide-mica pigments and/or other effect pigments such as platelet-shaped graphite, platelet-shaped iron oxide, multilayer effect pigments composed of PVD films and/or liquid crystal polymer pigments. Particular preference is given to platelet-shaped metal effect pigments, especially platelet-shaped aluminum pigments.

Typical color pigments especially include inorganic coloring pigments such as white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

The proportion of the pigments may, for example, be within the range from 0.5 to 30% by weight, preferably 1.5 to 20% by weight, more preferably 2.0 to 15% by weight, based in each case on the total weight of the aqueous basecoat material (b.2.1).

The basecoat material (b.2.1) comprises, through the use of components (CP), (R) and (X), curable binders, especially physically and thermally curable binders. A "binder" in the context of the present invention and in accordance with relevant DIN EN ISO 4618 is the nonvolatile component of a coating composition, without pigments and fillers. Specific binders are accordingly, for example, also standard coatings additives, the copolymer (CP), the reaction product (R), the polyurethane resin (X) or further polymers usable as described below, and typical crosslinking agents as described below. However, the expression is used hereinafter, merely for the sake of better clarity, principally in relation to particular physically and thermally curable polymers, for example particular polyurethanes, polyesters, polyacrylates and/or copolymers of the polymers mentioned.

The basecoat material (b.2.1) preferably also comprises at least one polymer other than the copolymers (CP), the reaction products (R) and the polyurethane resins (X) as a binder, especially at least one polymer selected from the group consisting of polyurethanes, polyesters, polyacrylates and/or copolymers of the polymers mentioned, especially polyurethane polyacrylates. Preferred polyurethane-polyacrylate copolymers (acrylated polyurethanes) other than the copolymers (CP) and the preparation thereof are described, for example, in WO 91/15528 A1, page 3 line 21 to page 20 line 33, and in DE 4437535 A1, page 2 line 27 to page line 22. The polymers described as binders are preferably hydroxy-functional. Preferably, the coating compositions of the invention comprise, as well as the at least one copolymer (CP), the at least one reaction product (R) and the at least one polyurethane resin (X), at least one polyurethane-polyacrylate copolymer other than the copolymers (CP).

The proportion of the further polymers as a binder, preferably the at least one polyurethane-polyacrylate copolymer other than the copolymers (CP), is preferably in the range from 0.5 to 20.0% by weight, more preferably 1.0 to 15.0% by weight, especially preferably 1.5 to 10.0% by weight, based in each case on the total weight of the aqueous basecoat material (b.2.1).

In addition, the basecoat material (b.2.1) preferably comprises at least one typical crosslinking agent known per se. It preferably comprises, as a crosslinking agent, at least one aminoplast resin and/or a blocked polyisocyanate, preferably an aminoplast resin. Among the aminoplast resins, melamine resins in particular are preferred.

The proportion of the crosslinking agents, especially aminoplast resins and/or blocked polyisocyanates, more preferably aminoplast resins, among these preferably melamine resins, is preferably in the range from 0.5 to 20.0% by weight, more preferably 1.0 to 15.0% by weight, especially preferably 1.5 to 10.0% by weight, based in each case on the total weight of the aqueous basecoat material (b.2.1).

Preferably, the basecoat material (b.2.1) additionally comprises at least one thickener. Suitable thickeners are inorganic thickeners from the group of the sheet silicates. Lithium-aluminum-magnesium silicates are particularly suitable. As well as the organic thickeners, however, it is also possible to use one or more organic thickeners. These are preferably selected from the group consisting of (meth) acrylic acid-(meth)acrylate copolymer thickeners, for example the commercial product Rheovis AS S130 (BASF), and of polyurethane thickeners, for example the commercial product Rheovis PU 1250 (BASF). The thickeners used are different than the above-described polymers, for example the preferred binders. Preference is given to inorganic thickeners from the group of the sheet silicates.

The proportion of the thickeners is preferably in the range from 0.01 to 5.0% by weight, preferably 0.02 to 4% by weight, more preferably 0.05 to 3.0% by weight, based in each case on the total weight of the aqueous basecoat material (b.2.1).

In addition, the aqueous basecoat material (b.2.1) may also comprise at least one additive. Examples of such additives are salts which can be broken down thermally without residue or substantially without residue, resins as binders that are curable physically, thermally and/or with actinic radiation and are different than the polymers already mentioned, further crosslinking agents, organic solvents, reactive diluents, transparent pigments, fillers, dyes soluble in a molecular dispersion, nanoparticles, light stabilizers, antioxidants, deaerating agents, emulsifiers, slip additives, polymerization inhibitors, initiators of free-radical polymerizations, adhesion promoters, flow control agents, film-forming assistants, sag control agents (SCAs), flame retardants, corrosion inhibitors, waxes, siccatives, biocides, and flatting agents.

Suitable additives of the aforementioned kind are known, for example, from

German patent application DE 199 48 004 A1, page 14 line 4 to page 17 line 5,

German patent DE 100 43 405 C1, column 5, paragraphs [0031] to [0033].

They are used in the customary and known amounts. For example, the proportion thereof may be in the range from 1.0 to 20.0% by weight, based in each case on the total weight of the aqueous basecoat material (b.2.1).

The solids content of the basecoat materials may vary according to the requirements of the individual case. The solids content is guided primarily by the viscosity required for application, more particularly for spray application, and so may be adjusted by the skilled person on the basis of his or her general art knowledge, optionally with assistance from a few exploratory tests.

The solids content of the basecoat materials (b.2.1) is preferably 5 to 70% by weight, more preferably 8 to 60% by weight, most preferably 12 to 55% by weight.

By solids content (nonvolatile fraction) is meant that weight fraction which remains as a residue on evaporation under specified conditions. In the present specification, the solids content is determined to DIN EN ISO 3251. This is done by evaporating the basecoat material at 130° C. for 60 minutes.

Unless stated otherwise, this test method is likewise employed in order, for example, to find out or predetermine the proportion of various components of the basecoat material, for example of a polyurethane resin, a copolymer (CP) or a crosslinking agent, in the total weight of the basecoat material. Thus, the solids content of a dispersion of a polyurethane resin, a copolymer (CP) or a crosslinking agent which is to be added to the basecoat material is determined. By taking into account the solids content of the dispersion and the amount of the dispersion used in the basecoat material, it is then possible to ascertain or find out the proportion of the component in the overall composition.

The basecoat material (b.2.1) is aqueous. The expression "aqueous" is known in this context to the skilled person. The phrase refers in principle to a basecoat material which is not based exclusively on organic solvents, i.e., does not contain exclusively organic-based solvents as its solvents but instead, in contrast, includes a significant fraction of water as solvent. "Aqueous" for the purposes of the present invention should preferably be understood to mean that the coating composition in question, more particularly the basecoat material, has a water fraction of at least 40% by weight, preferably at least 45% by weight, very preferably at least 50% by weight, based in each case on the total amount of the solvents present (i.e., water and organic solvents). Preferably in turn, the water fraction is 40 to 95% by weight, more particularly 45 to 90% by weight, very preferably 50 to 85% by weight, based in each case on the total amount of solvents present.

The same definition of "aqueous" of course also applies to all further systems described in the context of the present invention, for example to the aqueous character of the electrocoat materials (e.1) or the aqueous character of the aqueous dispersions of the copolymers (CP).

The basecoat materials (b.2.1) used in accordance with the invention can be produced using the mixing assemblies and mixing techniques that are customary and known for the production of basecoat materials.

At least one of the basecoat materials (b.2.2.x) used in the method of the invention has the features essential to the invention as described for the basecoat material (b.2.1). All the preferred embodiments and features described within the description of the basecoat material (b.2.1) apply preferentially to at least one of the basecoat materials (b.2.2.x).

In the above-described preferred variant (a) of stage (2.2) of the method of the invention, in which the two basecoat materials (b.2.2.x) used are identical, both basecoat materials (b.2.2.x) evidently have the features essential to the invention as described for the basecoat material (b.2.1). In this variant, the basecoat materials (b.2.2.x) preferably comprise effect pigments as described above, especially laminar aluminum pigments. Preferred proportions are 2 to 10% by weight, preferably 3 to 8° s by weight, based in each case on the total weight of the basecoat material. However, it may also comprise further pigments, i.e. particularly chromatic pigments.

In the above-described preferred variant (b) of stage (2.2) of the method of the invention, a first basecoat material (b.2.2.a) is preferably applied first, which can also be referred to as a color-preparatory basecoat material. It serves as a primer for a basecoat film which then follows, and which can then optimally fulfill its function of imparting color and/or an effect.

In a first particular embodiment of variant (b), a color-preparatory basecoat material of this kind is essentially free of chromatic pigments and effect pigments. More particularly, a basecoat material (b.2.2.a) of this kind contains less than 2% by weight, preferably less than 1% by weight, of chromatic pigments and effect pigments, based in each case on the total weight of the aqueous basecoat material. It is preferably free of such pigments. In this embodiment, the color-preparatory basecoat material comprises preferably black and/or white pigments, especially preferably both kinds of these pigments. Preferably, it contains 5 to 20% by weight, preferably 8 to 12% by weight, of white pigments and 0.05 to 1% by weight, preferably 0.1 to 0.5% by weight, of black pigments, based in each case on the total weight of the basecoat material. The gray color which results therefrom, which can be set at different brightness levels through the ratio of white and black pigments, constitutes an individually adjustable base for the basecoat buildup which then follows, such that the color and/or effect imparted by the basecoat material buildup which follows can be manifested optimally. The pigments are known to those skilled in the art and are also described above. A preferred white pigment here is titanium dioxide, a preferred black pigment carbon black.

For the basecoat material for the second basecoat, or for the second and third basecoats, within this embodiment of variant (b), the same preferably applies as was stated for basecoat material (b.2.2.x) described in variant (a). More particularly, it preferably comprises effect pigments. Both for the color-preparatory basecoat material (b.2.2.x) and for the second basecoat material (b.2.2.x) preferably comprising effect pigments, the features essential to the invention as described for the basecoat material (b.2.1) have to be fulfilled. Of course, both basecoat materials (b.2.2.x) may also fulfill these features.

In a second particular embodiment of the present invention, it is also possible for the color-preparatory basecoat material (b.2.2.a) to comprise chromatic pigments. This variant is an option especially when the resulting multicoat paint system is to have a highly chromatic hue, for example a very deep red or yellow. In that case, the color-preparatory basecoat material (b.2.2.a) contains, for example, a proportion of 2 to 6% by weight of chromatic pigments, especially red pigments are/or yellow pigments, preferably in combination with 3 to 15% by weight, preferably 4 to 10% by weight, of white pigments. The at least one further basecoat material which is then applied subsequently then obviously likewise comprises the chromatic pigments described, such that the first basecoat material (b.2.2.a) again serves for color preparation. In this embodiment too, any individual basecoat material (b.2.2.x), a plurality thereof or each of them may be one which fulfills the features essential to the invention as described for the basecoat material (b.2.1).

In the above-described preferred variant (c) of stage (2.2) of the method of the invention too, any individual basecoat material (b.2.2.x), a plurality thereof or each of them may be one which fulfills the features essential to the invention as described for the basecoat material (b.2.1).

The method of the invention allows the production of multicoat paint systems without a separate curing step. In spite of this, the employment of the method according to the invention results in multicoat paint systems having excellent impact resistance, especially stone-chip resistance.

The method described can in principle also be used for production of multicoat paint systems on nonmetallic substrates, for example plastics substrates. In that case, the basecoat material (b.2.1) or the first basecoat material (b.2.2.a) is applied to an optionally pretreated plastics substrate, preferably directly to an optionally pretreated plastics substrate.

The present invention is illustrated hereinafter by examples.

Examples

A) Preparation of a Copolymer (CP) or of an Aqueous Dispersion Comprising Said Polymer a) A dispersion of an alpha-methylstyryl-containing polyurethane was prepared on the basis of the patent DE 19948004 B4, page 27, example 1, "Herstellung eines erfindungsgemäßen Polyurethans (B)" ["Preparation of a polyurethane (B) of the invention"], except with additional use of trimethylolpropane and with a solids content of the resulting dispersion of only 29% rather than 35.1% by weight. Based on the adduct (B2) mentioned in the patent DE 19948004 B4, preparation example 1, an adduct was prepared with monoethanolamine rather than with diethanolamine:

For this purpose, a reaction vessel equipped with stirrer, internal thermometer, reflux condenser and electrical heater was first initially charged, under nitrogen, with 200.0 parts by weight of methyl ethyl ketone, 800.0 parts by weight of N-methylpyrrolidone and 221.3 parts by weight of monoethanolamine (from BASF SE) at 20° C. To this mixture were added dropwise, over the course of one and a half hours, 778.7 parts by weight of 1-(1-isocyanato-1-methylethyl)-3-(1-methylethenyl)benzene (TMI® (META) Unsaturated Aliphatic Isocyanate, from Cytec) having an isocyanate content of 20.4% by weight of isocyanate, such that the reaction temperature did not exceed 40° C. The resulting reaction mixture was stirred until no free isocyanate groups were detectable any longer. Thereafter, the reaction mixture was stabilized with 200 ppm of hydroquinone.

The theoretical solids content of the solution of the described adduct thus-prepared was 50% by weight.

Then, in a further reaction vessel equipped with stirrer, internal thermometer, reflux condenser and electrical heater, 431.7 parts by weight of a linear polyester polyol and 69.7 parts by weight of dimethylolpropionic acid (from GEO Specialty Chemicals) were dissolved in 355.8 parts by weight of methyl ethyl ketone and 61.6 parts by weight of N-methylpyrrolidone under nitrogen. The linear polyester polyol had been prepared beforehand from dimerized fatty acid (Pripol® 1012, from Uniqema), isophthalic acid (from BP Chemicals) and hexane-1,6-diol (from BASF SE) (weight ratio of the starting materials:dimeric fatty acid to isophthalic acid to hexane-1,6-diol=54.00:30.02:15.98) and had a hydroxyl number of 73 mg KOH/g solids and a number-average molar mass of 1379 g/mol. Added to the resulting solution at 45° C. were 288.6 parts by weight of isophorone diisocyanate (Basonat® I, from BASF SE) having an isocyanate content of 37.75% by weight. After the exothermic reaction had abated, the reaction mixture was heated gradually to 80° C. while stirring. Stirring was continued at this temperature until the isocyanate content of the solution was constant at 3.2% by weight. Thereafter, the reaction mixture was cooled to 65° C., and 85.2 parts by weight of the above-described adduct were added together with 21.8 parts by weight of trimethylolpropane (from BASF SE). The resulting reaction mixture was stirred at 65° C. until the isocyanate content of the solution had fallen to 1.0% by weight. Now 22.2% by weight of the diethanolamine (from BASF SE) were added and the content of isocyanate groups was monitored until no free isocyanate groups were detectable any longer. The resulting dissolved polyurethane was admixed with 139.7 parts by weight of methoxypropanol and 43.3 parts by weight of triethylamine (from BASF SE). 30 minutes after the addition of amine, the temperature of the solution was lowered to 60° C., after which 1981 parts by weight of deionized water were added while stirring over the course of 30 minutes. The methyl ethyl ketone was distilled out of the resulting dispersion at 60° C. under reduced pressure. Thereafter, any losses of solvent and water were compensated for.

The dispersion of an alpha-methylstyryl-containing polyurethane thus obtained had a solids content of 29.0% by weight, the acid number was 34.0 mg KOH/g solids, and the pH was 7.0 (measured at 23° C.)

b) To prepare the aqueous primary dispersion of the copolymer (CP) of the invention, under a nitrogen atmosphere, 1961.2 parts by weight of the alpha-methylstyryl-containing polyurethane dispersion according to a) were diluted with 40.0 parts by weight of methoxypropanol (0.07% based on polyurethane) and 686.5 parts by weight of deionized water, and heated to 80° C. After the reactor contents had been heated to 80° C., 0.6 part by weight of ammonium peroxodisulfate, dissolved in 35.7 parts by weight of deionized water, were introduced into the reactor under standard pressure. Subsequently, with continued stirring, a mixture of 301.6 parts by weight of methyl methacrylate, 261.6 parts by weight of n-butyl acrylate, 5.6 parts by weight of allyl methacrylate (0.87 mol % based on total vinyl monomer) and 134.9 parts by weight of N-methylpyrrolidone was added homogeneously over the course of five hours. With commencement of the addition of the monomer mixture, a solution of 1.1 parts by weight of ammonium peroxodisulfate in 71.3 parts by weight of deionized water was likewise added within five hours.

During the free-radical polymerization, every 30 minutes, the content of free monomers was determined by means of gas chromatography (GC) (GC: once with 50 m silica capillary column with polyethylene glycol phase and once with 50 m silica capillary column with polydimethylsiloxane phase, carrier gas: helium, split injector 150° C., oven temperature 40-220° C., flame ionization detector, detector temperature 275° C., internal standard: isobutyl acrylate), and the highest total monomer content based on dispersion of 0.5% by weight was found after 30 min (3.1% by weight based on the total amount of olefinically unsaturated monomers used for polymerization). After the simultaneous end of the metered addition of monomer and initiator, the resulting reaction mixture was stirred at 80° C. for a further hour and then cooled to room temperature.

The resulting primary dispersion of the copolymer had a very good storage stability. The solids content thereof was 32.5% by weight, the acid number was 18.8 mg KOH/g solids, and the pH thereof was 7.0. The particle size (z average) by means of photon correlation spectroscopy was 96 nm. By means of gas chromatography (GC: once with 50 m silica capillary column with polyethylene glycol phase and once with 50 m silica capillary column with polydimethylsiloxane phase, carrier gas: helium, split injector 250° C., oven temperature 40-220° C., flame ionization detector, detector temperature 275° C., internal standard: n-propyl glycol), a content of 2.7% by weight of methoxypropanol and 5.7% by weight of N-methylpyrrolidone was found.

After the extraction of the freeze-dried polymer by means of tetrahydrofuran, the gel content was found gravimetrically to be 80.3% by weight. For this purpose, the dispersion was freeze-dried and the mass of the freeze-dried polymer was determined, and then the polymer was extracted in an excess of tetrahydrofuran (ratio of tetrahydrofuran to freeze-dried copolymer=300:1) at 25° C. for 24 hours. The insoluble content (gel content) was isolated, dried at 50° C. in an air circulation oven for 4 hours, and then re-weighed.

B) Preparation of a Reaction Product (R)

In a 4 l stainless steel reactor equipped with anchor stirrer, thermometer, condenser, thermometer for overhead temperature measurement and water separator, 2000.0 g of linear diolic PolyTHF1000 (2 mol), 579.3 g of dimer fatty acid (1 mol) and 51 g of cyclohexane were heated to 100° C. in the presence of 2.1 g of di-n-butyltin oxide (Axion® CS 2455, from Chemtura). Heating was continued gently until the onset of the condensation. With a maximum overhead temperature of 85° C., heating was then continued in steps up to 220° C. The progress of the reaction was monitored via the determination of the acid number. When an acid number of 3 mg KOH/g was reached, cyclohexane still present was removed by vacuum distillation. A viscous resin was obtained.

Amount of condensate (water): 34.9 g

Acid number: 2.7 mg KOH/g

Solids content (60 min at 130° C.): 100.0%

Molecular weight (vapor pressure osmosis):

Mn: 2200 g/mol

Viscosity: 5549 mPas, (measured at 23° C. using a rotational viscometer from Brookfield, model CAP 2000+, spindle 3, shear rate: 1333 $s^{-1}$)

1. Production of a Non-Inventive Waterborne Basecoat Material 1

The components listed under "aqueous phase" in table A were stirred together in the order stated to form an aqueous mixture. The combined mixture was then stirred for 10 minutes and adjusted, using deionized water and dimethylethanolamine, to a pH of 8 and to a spray viscosity of 58 mPas under a shearing load of 1000 $s^{-1}$ as measured with a rotary viscometer (Rheomat RM 180 instrument from Mettler-Toledo) at 23° C.

TABLE A

Waterborne basecoat material 1

| Component Aqueous phase | Parts by weight |
|---|---|
| 3% Na—Mg sheet silicate solution | 14 |
| Deionized water | 16 |
| Butyl glycol | 1.4 |
| Polyester; prepared as per example D, column 16 lines 37-59 of DE-A-4009858 | 2.3 |
| 3% by weight aqueous Rheovis ® AS S130 solution; rheological agent, available from BASF, in water | 6 |
| TMDD (BASF) | 1.6 |
| Melamine-formaldehyde resin (Cymel ® 1133 from Allnex) | 5.9 |
| 10% dimethylethanolamine in water | 0.4 |
| Polyurethane dispersion - prepared as per WO 92/15405 (page 14 line 13 to page 15 line 13) | 20 |
| 2-Ethylhexanol | 3.5 |
| Triisobutyl phosphate | 2.5 |
| Nacure ® 2500 from King Industries | 0.6 |
| White paste | 24 |
| Carbon black paste | 1.8 |

Production of the Carbon Black Paste:

The carbon black paste was produced from 25 parts by weight of an acrylated polyurethane dispersion produced as per international patent application WO 91/15528, binder dispersion A, 10 parts by weight of carbon black, 0.1 part by weight of methyl isobutyl ketone, 1.36 parts by weight of dimethylethanolamine (10% in demineralized water), 2 parts by weight of a commercial polyether (Pluriol® P900 from BASF SE) and 61.45 parts by weight of deionized water.

Production of the White Paste:

The white paste was produced from 43 parts by weight of an acrylated polyurethane dispersion produced as per international patent application WO 91/15528, binder dispersion A, 50 parts by weight of titanium rutile 2310, 3 parts by weight of 1-propoxy-2-propanol and 4 parts by weight of deionized water.

2. Preparation of a Non-Inventive Waterborne Basecoat Material 2

The components listed under "aqueous phase" in table B were stirred together in the order stated to form an aqueous mixture. In the next step an organic mixture was prepared from the components listed under "organic phase". The organic mixture was added to the aqueous mixture. The combined mixture was then stirred for 10 minutes and adjusted, using deionized water and dimethylethanolamine, to a pH of 8 and to a spray viscosity of 58 mPas under a shearing load of 1000 s$^{-1}$ as measured with a rotary viscometer (Rheomat RM 180 instrument from Mettler-Toledo) at 23° C.

TABLE B

| Waterborne basecoat material 2 | |
|---|---|
| Component | Parts by weight |
| Aqueous phase | |
| 3% Na—Mg sheet silicate solution | 29.1 |
| Deionized water | 10.5 |
| Butyl glycol | 4.1 |
| Polyurethane-modified polyacrylate; prepared as per page 7 line 55 to page 8 line 23 of DE 4437535 A1 | 2.8 |
| 50% strength by weight solution of Rheovis ® PU 1250 (BASF), rheological agent | 0.2 |
| Polyester; prepared as per example D, column 16 lines 37-59 of DE-A-4009858 | 5.5 |
| TMDD (BASF) | 1.4 |
| Melamine-formaldehyde resin (Luwipal 052 from BASF SE) | 2.9 |
| 10% dimethylethanolamine in water | 0.4 |
| Polyurethane-based graft copolymer; prepared analogously to DE 19948004 - B4 (page 27, example 2), solids content adjusted to 32.5% by weight with water | 24.1 |
| Isopropanol | 1.6 |
| Isopar ® L from Exxon Mobil | 2 |
| BYK-347, Altana | 0.6 |
| Pluriol ® P 900 from BASF SE | 0.4 |
| Tinuvin ® 384-2 from BASF SE | 0.7 |
| Tinuvin 123 from BASF SE | 0.4 |
| Carbon black paste | 0.4 |
| Blue paste | 1.5 |
| Organic phase | |
| Aluminum pigment, available from Altana-Eckart | 3.8 |
| Butyl glycol | 3.8 |
| Polyurethane-based graft copolymer; prepared analogously to DE 19948004 - B4 (page 27, example 2), solids content adjusted to 32.5% by weight with water | 3.8 |

Production of the Blue Paste:

The blue paste was produced from 69.8 parts by weight of an acrylated polyurethane dispersion produced as per international patent application WO 91/15528, binder dispersion A, 12.5 parts by weight of Paliogen® Blue L 6482, 1.5 parts by weight of dimethylethanolamine (10% in demineralized water), 1.2 parts by weight of a commercial polyether (Pluriol® P900 from BASF SE) and 15 parts by weight of deionized water.

Production of the Carbon Black Paste:

The carbon black paste was produced from 25 parts by weight of an acrylated polyurethane dispersion produced as per international patent application WO 91/15528, binder dispersion A, 10 parts by weight of carbon black, 0.1 part by weight of methyl isobutyl ketone, 1.36 parts by weight of dimethylethanolamine (10% in demineralized water), 2 parts by weight of a commercial polyether (Pluriol® P900 from BASF SE) and 61.45 parts by weight of deionized water.

3. Preparation of a Non-Inventive Waterborne Basecoat Material 3

The waterborne basecoat material 3 was produced analogously to table B, except that, rather than the dispersion of the polyurethane-based graft copolymer, prepared analogously to DE 19948004-B4 (page 27, example 2), the dispersion of a copolymer (CP) described in A) was used.

4. Preparation of a Non-Inventive Waterborne Basecoat Material 4

The waterborne basecoat material 4 was produced analogously to the waterborne basecoat material 3, except that, rather than the polyester prepared as per example D, column 16 lines 37-59 of DE-A-4009858, the reaction product (R) described in A) was used. The different amounts of butyl glycol in the waterborne basecoat material 4, caused by the different solids content of the dispersion of the polyester from DE-A-4009858 and the reaction product R, were compensated for by appropriate addition of butyl glycol.

5. Production of a Waterborne Basecoat Material I1 of the Invention

The waterborne basecoat material I1 was produced analogously to the waterborne basecoat material 4, except that, in the aqueous phase, rather than 24.1% by weight of the dispersion of the copolymer (CP), only 16.5% by weight were used. In addition, 9.1% by weight of the polyurethane resin (X) was used. The preparation of the polyurethane resin (X) is guided by WO 92/15405, page 14 line 13 to page 15 line 13. The resin has an acid number of 25 mg KOH/g and a number-average molecular weight of 12 000 g/mol.

Comparison Between Waterborne Basecoat Materials 2-4 and I1

To determine the stone-chip resistance/stone-chip stability, multicoat paint systems were produced by the following general method:

A cathodically electrocoated steel sheet of dimensions 10×20 cm served as the substrate. First of all, the waterborne basecoat material 1 was applied pneumatically to this sheet in a film thickness of 18 to 22 micrometers. After the basecoat material had been flashed off at room temperature for 4 min, waterborne basecoat materials 2-4 or I1 were applied, then flashed off at room temperature for 4 min, and then intermediately dried in an air circulation oven at 70° C. for 10 min. A customary two-component clearcoat material was applied pneumatically in a film thickness of 35 to 45 micrometers to the intermediately dried waterborne basecoat. The resulting clearcoat was flashed off at room temperature for 20 minutes. The waterborne basecoat and the clearcoat were then cured in an air circulation oven at 160° C. for 30 minutes.

The multicoat paint systems thus obtained were examined for stone-chip resistance. For this purpose, the stone-chip test was conducted to DIN 55966-1. The assessment of the results of the stone-chip test was conducted to DIN EN ISO 20567-1. The results can be found in table 1.

TABLE 1

| Stone-chip resistance of waterborne basecoat materials 2-4 and I1 on waterborne basecoat material 1 | | |
|---|---|---|
| WBM | Stone-chip result | Assessment |
| 2 | 3.5 | not OK |
| 3 | 3.0 | not OK |
| 4 | 2.0 | not OK |
| I1 | 1.5 | OK |

The results show that the use of a basecoat material (b.2.2.x) for use in accordance with the invention distinctly increases stone-chip resistance compared to waterborne basecoat materials 2-4.

6. Preparation of a Non-Inventive Waterborne Basecoat Material 5

The components listed under "aqueous phase" in table C were stirred together in the order stated to form an aqueous mixture. In the next step an organic mixture was prepared from the components listed under "organic phase". The organic mixture was added to the aqueous mixture. The combined mixture was then stirred for 10 minutes and adjusted, using deionized water and dimethylethanolamine, to a pH of 8 and to a spray viscosity of 58 mPas under a shearing load of 1000 $s^{-1}$ as measured with a rotary viscometer (Rheomat RM 180 instrument from Mettler-Toledo) at 23° C.

TABLE C

Waterborne basecoat material 5

| Component | Parts by weight |
|---|---|
| Aqueous phase | |
| 3% Na—Mg sheet silicate solution | 29.1 |
| Deionized water | 11.7 |
| Butyl glycol | 4.1 |
| Polyurethane-modified polyacrylate; prepared as per page 7 line 55 to page 8 line 23 of DE 4437535 A1 | 2.8 |
| 50% strength by weight solution of Rheovis ® PU 1250 (BASF), rheological agent | 0.2 |
| Polyester; prepared as per example D, column 16 lines 37-59 of DE-A-4009858 | 5.5 |
| TMDD (BASF) | 1.4 |
| Melamine-formaldehyde resin (Luwipal 052 from BASF SE) | 2.9 |
| 10% dimethylethanolamine in water | 0.6 |
| Polyurethane-based graft copolymer; prepared analogously to DE 19948004 - B4 (page 27, example 2), solids content adjusted to 32.5% by weight with water | 24.1 |
| Isopropanol | 1.6 |
| Isopar ® L from Exxon Mobil | 2 |
| Byk-347 ® from Altana | 0.6 |
| Pluriol ® P 900 from BASF SE | 0.4 |
| Tinuvin ® 384-2 from BASF SE | 0.7 |
| Tinuvin 123 from BASF SE | 0.4 |
| Carbon black paste | 5 |
| Blue paste | 1 |
| Mica dispersion | 5 |
| Organic phase | |
| Aluminum pigment, available from Altana-Eckart | 0.3 |
| Butyl glycol | 0.3 |
| Polyurethane-based graft copolymer; prepared analogously to DE 19948004 - 34 (page 27, example 2), solids content adjusted to 32.5% by weight with water | 0.3 |

Production of the Blue Paste:

The blue paste was produced from 69.8 parts by weight of an acrylated polyurethane dispersion produced as per international patent application WO 91/15528, binder dispersion A, 12.5 parts by weight of Paliogen® Blue L 6482, 1.5 parts by weight of dimethylethanolamine (10% in demineralized water), 1.2 parts by weight of a commercial polyether (Pluriol® P900 from BASF SE) and 15 parts by weight of deionized water.

Production of the Carbon Black Paste:

The carbon black paste was produced from 25 parts by weight of an acrylated polyurethane dispersion produced as per international patent application WO 91/15528, binder dispersion A, 10 parts by weight of carbon black, 0.1 part by weight of methyl isobutyl ketone, 1.36 parts by weight of dimethylethanolamine (10% in demineralized water), 2 parts by weight of a commercial polyether (Pluriol® P900 from BASF SE) and 61.45 parts by weight of deionized water.

Production of the Mica Dispersion:

The mica dispersion was produced by mixing, using a stirrer unit, of 1.5 parts by weight of polyurethane-based graft copolymer, prepared analogously to DE 19948004-B4 (page 27, example 2), solids content adjusted to 32.5% by weight with water, and 1.3 parts by weight of the commercial mica Mearlin Ext. Fine Violet 539V from Merck.

7. Production of a Non-Inventive Waterborne Basecoat Material 6

The waterborne basecoat material 6 was produced analogously to table C, except that, rather than the dispersion of the polyurethane-based graft copolymer, prepared analogously to DE 19948004-B4 (page 27, example 2), the dispersion of a copolymer (CP) described in A) was used.

8. Production of a Non-Inventive Waterborne Basecoat Material 7

The waterborne basecoat material 7 was produced analogously to the waterborne basecoat material 6, except that, rather than the polyester prepared as per example D, column 16 lines 37-59 of DE-A-4009858, the reaction product (R) described in A) was used. The different amounts of butyl glycol in the waterborne basecoat material 7, caused by the different solids content of the dispersion of the polyester from DE-A-4009858 and the reaction product R, were compensated for by appropriate addition of butyl glycol.

9. Production of a Waterborne Basecoat Material 12 of the Invention

The waterborne basecoat material 12 was produced analogously to the waterborne basecoat material 7, except that, in the aqueous phase, rather than 24.1% by weight of the dispersion of the copolymer (CP), only 20.0% by weight were used. In addition, 6.5% by weight of the polyurethane resin (X) was used. The preparation of the polyurethane resin (X) is guided by WO 92/15405, page 14 line 13 to page 15 line 13. The resin has an acid number of 25 mg KOH/g and a number-average molecular weight of 12 000 g/mol.

Comparison of Waterborne Basecoat Materials 5-7 and 12

To determine the stone-chip resistance/stone-chip stability, multicoat paint systems were produced by the following general method:

A cathodically electrocoated steel sheet of dimensions 10×20 cm served as the substrate. First of all, the particular basecoat material was applied to this sheet pneumatically in a film thickness of 20 to 24 micrometers. After the basecoat material had been flashed off at room temperature for 1 min, the basecoat material was intermediately dried in an air circulation oven at 70° C. for 10 min. A customary two-component clearcoat material was applied pneumatically in a film thickness of 35 to 45 micrometers to the intermediately dried waterborne basecoat. The resulting clearcoat was flashed off at room temperature for 20 minutes. The waterborne basecoat and the clearcoat were then cured in an air circulation oven at 160° C. for 30 minutes.

The multicoat paint systems thus obtained were examined for stone-chip resistance. For this purpose, the stone-chip test was conducted to DIN 55966-1. The assessment of the results of the stone-chip test was conducted to DIN EN ISO 20567-1. The results can be found in table 2.

TABLE 2

Stone-chip resistance of waterborne basecoat materials 5-7 and I2

| WBM | Stone-chip result | Assessment |
|---|---|---|
| 5 | 4.5 | not OK |
| 6 | 4.0 | not OK |
| 7 | 2.5 | not OK |
| I1 | 1.5 | OK |

The results show that the use of a basecoat material (b.2.1) distinctly increases stone-chip resistance compared to waterborne basecoat materials 5-7.

Figure 1:
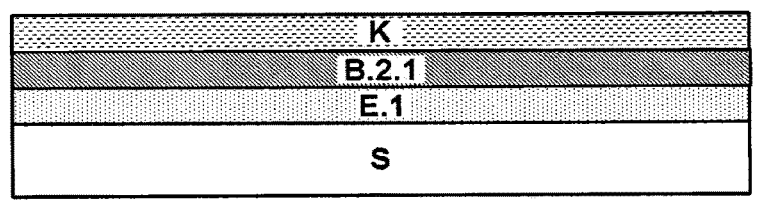
FIG. 1.
Figure 2:
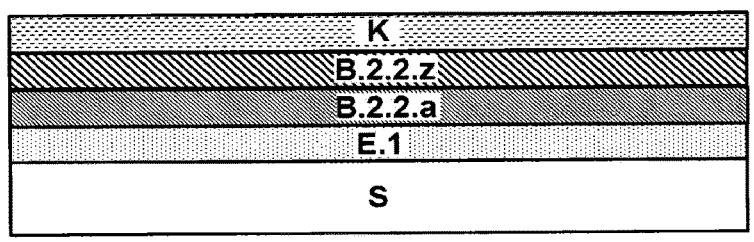
Figure 3:
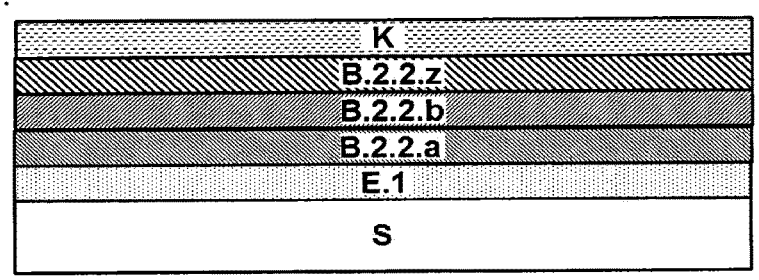

Schematic formation of a multicoat paint system (M) of the invention, arranged on a metallic substrate (S), and comprising a cured electrocoat (E.1) and a basecoat (B.2.1) and a clearcoat (K), which have been cured jointly.

FIG. 2:

Schematic formation of a multicoat paint system (M) of the invention, arranged on a metallic substrate (S), and comprising a cured electrocoat (E.1), two basecoats (B.2.2.x), namely a first basecoat (B.2.2.a) and an uppermost basecoat (B.2.2.z) arranged above it, and a clearcoat (K), which have been cured jointly.

FIG. 3:

Schematic formation of a multicoat paint system (M) of the invention, arranged on a metallic substrate (S), and comprising a cured electrocoat (E.1), three basecoats (B.2.2.x), namely a first basecoat (B.2.2.a), a basecoat (B.2.2.b) arranged above it and an uppermost basecoat (B.2.2.z), and a clearcoat (K), which have been cured jointly.

The invention claimed is:

1. A method for producing a multicoat paint system on a metallic substrate, the method comprising:

electrophoretically applying an electrocoat to a metallic substrate, and subsequently curing the electrocoat, to obtain a cured electrocoat on the metallic substrate;

applying an aqueous basecoat material directly to the cured electrocoat, or applying a plurality of basecoat materials in direct succession to the cured electrocoat, to obtain a basecoat, or a plurality of directly successive basecoats, directly on the cured electrocoat;

applying a clearcoat material directly to the basecoat, or directly to an uppermost basecoat of the plurality of directly successive basecoats, to obtain a clearcoat directly on the basecoat or directly on the uppermost basecoat; and jointly curing the basecoat and the clearcoat, or jointly curing the plurality of directly successive basecoats and the clearcoat, to obtain a multicoat paint system on the metallic substrate, wherein the basecoat material, or at least one of the plurality of basecoat materials, comprises:

at least one aqueous dispersion comprising at least one copolymer (CP) prepared by:

(i) initially charging an aqueous dispersion of at least one polyurethane (Y), and then (ii) polymerizing a mixture of olefinically unsaturated monomers in the presence of the polyurethane (Y), wherein, in the polymerizing (ii), (a) a water-soluble initiator is present, (b) the olefinically unsaturated monomers are metered in such that a concentration of 6.0% by weight, based on a total amount of the olefinically unsaturated monomers in a reaction solution of the polymerizing (ii), is not exceeded over an entire reaction time, and (c) the mixture of the olefinically unsaturated monomers comprises at least one polyolefinically unsaturated monomer;

at least one linear hydroxy-functional reaction product (R) having an acid number less than 20 mg KOH/g, which is prepared from at least one compound (v) comprising two functional groups and an aliphatic or araliphatic hydrocarbyl radical which is arranged between the functional groups and has 12 to 70 carbon atoms; and at least one polyurethane resin (X), which is prepared from at least one compound (x.1) comprising at least one carboxylic acid group and at least one group reactive toward isocyanate groups.

2. The method as claimed in claim 1, wherein the mixture of olefinically unsaturated monomers comprises 0.1 to 6.0 mol % of the at least one polyolefinically unsaturated monomer.

3. The method as claimed in claim 1, wherein the mixture of olefinically unsaturated monomers comprises allyl methacrylate, and no further polyolefinically unsaturated monomers are present in the mixture of olefinically unsaturated monomers.

4. The method as claimed in claim 1, wherein the compound (v) comprise at least one dimeric fatty acid, at least one dimer diol, or both.

5. The method as claimed in claim 1, wherein:

the reaction product (R) is prepared by reacting at least one dimer fatty acid with at least one aliphatic, araliphatic and/or aromatic dihydroxy-functional compound having a number-average molecular weight of 120 to 6000 g/mol; and the dihydroxy-functional compound is a polyether diol, a polyester diol, a dimer diol, or mixtures thereof.

6. The method as claimed in claim 1, wherein the polyurethane resin (X) is prepared from at least one alpha,alpha-dimethylolalkanoic acid as the compound (x.1).

7. The method as claimed in claim 6, wherein the at least one alpha,alpha-dimethylolalkanoic acid is at least one selected from the group consisting of 2,2-dimethylolacetic acid, 2,2-dimethylolpropionic acid, 2,2-dimethylolbutyric acid and 2,2-dimethylolpentanoic acid.

8. The method as claimed in claim 1, wherein the basecoat material, or the at least one of the plurality of basecoat materials, further comprises:

at least one hydroxy-functional polymer that is different from the copolymer (CP), the linear hydroxy-functional reaction product (R) and the polyurethane (X), said hydroxyl-functional polymer being selected from the group consisting of a polyurethane, a polyester, a polyacrylate and copolymers thereof.

9. The method as claimed in claim 8, wherein:

the plurality of basecoat materials are applied in direct succession to the cured electrocoat; and all of the plurality of basecoat materials further comprise at least one hydroxy-functional polymer.

10. The method as claimed in claim 1, wherein the basecoat material, or the at least one of the plurality of basecoat materials, further comprises:

a melamine resin as a crosslinking agent.

11. The method as claimed in claim 1, wherein the basecoat material, or the at least one of the plurality of basecoat materials, further comprises:

at least one color pigment, at least one effect pigment, or both.

12. The method as claimed in claim 10, wherein:
the plurality of basecoat materials are applied in direct succession to the cured electrocoat; and
all of the plurality of basecoat materials further comprise a melamine resin as a crosslinking agent.

13. The method as claimed in claim 1, wherein the basecoat material, or the at least one of the plurality of basecoat materials, is a one-component coating composition.

14. The method as claimed in claim 11, wherein:
the plurality of basecoat materials are applied in direct succession to the cured electrocoat; and
all of the plurality of basecoat materials further comprise at least one color pigment, at least one effect pigment, or both.

15. The method as claimed in claim 1, wherein the jointly curing is performed at temperatures of 100 to 250° C. for a period of 5 to 60 min.

16. The method as claimed in claim 13, wherein:
the plurality of basecoat material are applied in direct success to cured electrocoat; and
all of the plurality of basecoat materials are one-component coating compositions.

17. The method as claimed in claim 1, wherein the metallic substrate is an automobile body.

18. The method as claimed in claim 1, wherein the mixture of olefinically unsaturated monomers comprises less than 10.0% by weight of vinylaromatic monomers, based on the total amount of the olefinically unsaturated monomers in the reaction solution of the polymerizing (ii).

19. A multicoat paint system produced by the method of claim 1.

* * * * *

UNITED STATES PATENT AND TRADEMARK OFFICE
CERTIFICATE OF CORRECTION

| | |
|---|---|
| PATENT NO. | : 10,196,528 B2 |
| APPLICATION NO. | : 15/104820 |
| DATED | : February 5, 2019 |
| INVENTOR(S) | : Bernhard Steinmetz et al. |

It is certified that error appears in the above-identified patent and that said Letters Patent is hereby corrected as shown below:

In the Specification

Column 11, Line 33, "min and/or intermediately dried at a temperature of prefer-", should read -- 30 min and/or intermediately dried at a temperature of prefer- --

Column 45, Line 53, "analogously to DE 19948004 - 34 (page 27,", should read -- analogously to DE 19948004 - B4 (page 27, --

Column 46, Line 34, "9. Production of a Waterborne Basecoat Material 12 of the", should read -- 9. Production of a Waterborne Basecoat Material I2 of the --

Column 46, Line 36, "The waterborne basecoat material 12 was produced analo", should read -- The waterborne basecoat material I2 was produced analo --

Column 46, Line 45, "Comparison of Waterborne Basecoat Materials 5-7 and 12", should read -- Comparison of Waterborne Basecoat Materials 5-7 and I2 --

Signed and Sealed this
Twenty-first Day of April, 2020

Andrei Iancu
*Director of the United States Patent and Trademark Office*